US009565621B2

United States Patent
Sawamoto et al.

(10) Patent No.: US 9,565,621 B2
(45) Date of Patent: Feb. 7, 2017

(54) INFORMATION PROCESSING DEVICE, COMMUNICATION CONTROL METHOD, AND MOBILE COMMUNICATION SYSTEM

(71) Applicant: FUJITSU LIMITED, Kawasaki-shi, Kanagawa (JP)

(72) Inventors: Toshiro Sawamoto, Yokohama (JP); Kazuaki Ando, Shibuya (JP); Hiroyuki Seki, Kamakura (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/099,684

(22) Filed: Dec. 6, 2013

(65) Prior Publication Data
US 2014/0364154 A1 Dec. 11, 2014

(30) Foreign Application Priority Data
Dec. 11, 2012 (JP) .................................. 2012-270001

(51) Int. Cl.
*H04W 24/00* (2009.01)
*H04W 48/04* (2009.01)
*H04W 64/00* (2009.01)
*H04W 24/08* (2009.01)
*H04W 24/10* (2009.01)

(52) U.S. Cl.
CPC ............ *H04W 48/04* (2013.01); *H04W 24/08* (2013.01); *H04W 24/10* (2013.01); *H04W 64/00* (2013.01)

(58) Field of Classification Search
None
See application file for complete search history.

(56) References Cited

U.S. PATENT DOCUMENTS

| 2002/0082017 A1* | 6/2002 | Hattori ........................ 455/436 |
| 2007/0225014 A1 | 9/2007 | Kurose |
| 2008/0279153 A1* | 11/2008 | Xie et al. ..................... 370/332 |
| 2009/0052330 A1* | 2/2009 | Matsunaga et al. .......... 370/242 |
| 2011/0243077 A1 | 10/2011 | Tazaki |
| 2011/0256881 A1* | 10/2011 | Huang et al. .............. 455/456.1 |
| 2011/0302033 A1* | 12/2011 | Lee ....................... G06Q 30/02 705/14.57 |
| 2012/0238297 A1 | 9/2012 | Nakagawa et al. |

FOREIGN PATENT DOCUMENTS

| JP | 2000-209654 A | 7/2000 |
| JP | 2007-259346 A | 10/2007 |
| JP | 2010-206316 A | 9/2010 |
| JP | 2011-216950 A | 10/2011 |
| JP | 2012-195771 A | 10/2012 |

OTHER PUBLICATIONS

Japanese Office Action of related Japanese Patent Application No. 2012-270001 dated Jul. 5, 2016.

* cited by examiner

Primary Examiner — Marivelisse Santiago Cordero
Assistant Examiner — Moustapha Diaby
(74) Attorney, Agent, or Firm — Arent Fox LLP

(57) ABSTRACT

An information processing device, includes: a memory configured to store data of one or more indices of radio quality at a plurality of points; and a processor coupled to the memory and configured to: identify one or more points among the plurality of points other than a current location of a mobile terminal that requests communication, and determine whether to permit the communication based on statistical information obtained from the one or more indices of the radio quality at the one or more points.

6 Claims, 23 Drawing Sheets

FIG. 2

| MEAN / VARIANCE | HIGH | LOW |
|---|---|---|
| LARGE | NG | NG |
| SMALL | OK | NG |

FIG. 14

| SPEED OF TRAVEL v [km/h] | $v_1$ | $v_2$ | $v_3$ | $v_4$ | $v_5$ OR MORE |
|---|---|---|---|---|---|
| ONE SIDE OF EVALUATION AREA [m] | a x n | b x n | c x n | d x n | e x n |

FIG. 15

| SPEED OF TRAVEL v [km/h] | $v_1$ | $v_2$ | $v_3$ | $v_4$ | $v_5$ OR MORE |
|---|---|---|---|---|---|
| ONE SIDE OF EVALUATION AREA [m] | a x s | b x s | c x s | d x s | e x s |

FIG. 21

| FILE SIZE [Mbyte] | $f_1$ | $f_2$ | $f_3$ | $f_4$ | $f_5$ OR MORE |
|---|---|---|---|---|---|
| MEAN THRESHOLD [dB] | $\mu_1$ | $\mu_2$ | $\mu_3$ | $\mu_4$ | $\mu_5$ |
| VARIANCE THRESHOLD [dB] | $\sigma_1$ | $\sigma_2$ | $\sigma_3$ | $\sigma_4$ | $\sigma_5$ |

FIG. 23

| NUMBER OF CONNECTED [USERS] | $UE_1$ | $UE_2$ | $UE_3$ | $UE_4$ | $UE_5$ OR MORE |
|---|---|---|---|---|---|
| MEAN THRESHOLD [dB] | $\mu_1$ | $\mu_2$ | $\mu_3$ | $\mu_4$ | $\mu_5$ |
| VARIANCE THRESHOLD [dB] | $\sigma_1$ | $\sigma_2$ | $\sigma_3$ | $\sigma_4$ | $\sigma_5$ |

US 9,565,621 B2

INFORMATION PROCESSING DEVICE, COMMUNICATION CONTROL METHOD, AND MOBILE COMMUNICATION SYSTEM

CROSS-REFERENCE TO RELATED APPLICATION

This application is based upon and claims the benefit of priority of the prior Japanese Patent Application No. 2012-270001, filed on Dec. 11, 2012, the entire contents of which are incorporated herein by reference.

FIELD

The embodiments discussed herein are related to an information processing device, a communication control method, and a mobile communication system.

BACKGROUND

Recently, the widespread use of multifunctional mobile terminals called smartphones has led to an increase in the amount of mobile communication system traffic. The operator of a mobile communication system is obliged to increase the communication capacity of the entire mobile communication system as one of the measures against the increase in traffic. For example, various measures, such as data compression and an image frame reduction, as well as capital investment, such as increasing the number of base stations and offload, have been proposed.

Japanese Laid-open Patent Publication No. 2007-259346, Japanese Laid-open Patent Publication No. 2011-216950, and Japanese Laid-open Patent Publication No. 2010-206316 disclose examples of the related art.

SUMMARY

According to an aspect of the invention, an information processing device, includes: a memory configured to store data of one or more indices of radio quality at a plurality of points; and a processor coupled to the memory and configured to: identify one or more points among the plurality of points other than a current location of a mobile terminal that requests communication, and determine whether to permit the communication based on statistical information obtained from the one or more indices of the radio quality at the one or more points.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates an example of a communication assignment determination table;

FIG. 14 illustrates an example of a correspondence table between the speed of travel of the mobile terminal and the length of one side of the evaluation area;

FIG. 15 illustrates an example of a correspondence table between the speed of travel of the mobile terminal and the length of an interval of location information notification;

FIG. 21 illustrates an example of a correspondence table between the file size, and the mean threshold and the variance threshold applied in a sixth embodiment;

FIG. 23 illustrates a correspondence table between the number of connected users, and the mean threshold and the variance threshold applied in a seventh embodiment.

DESCRIPTION OF EMBODIMENTS

Figure 1:
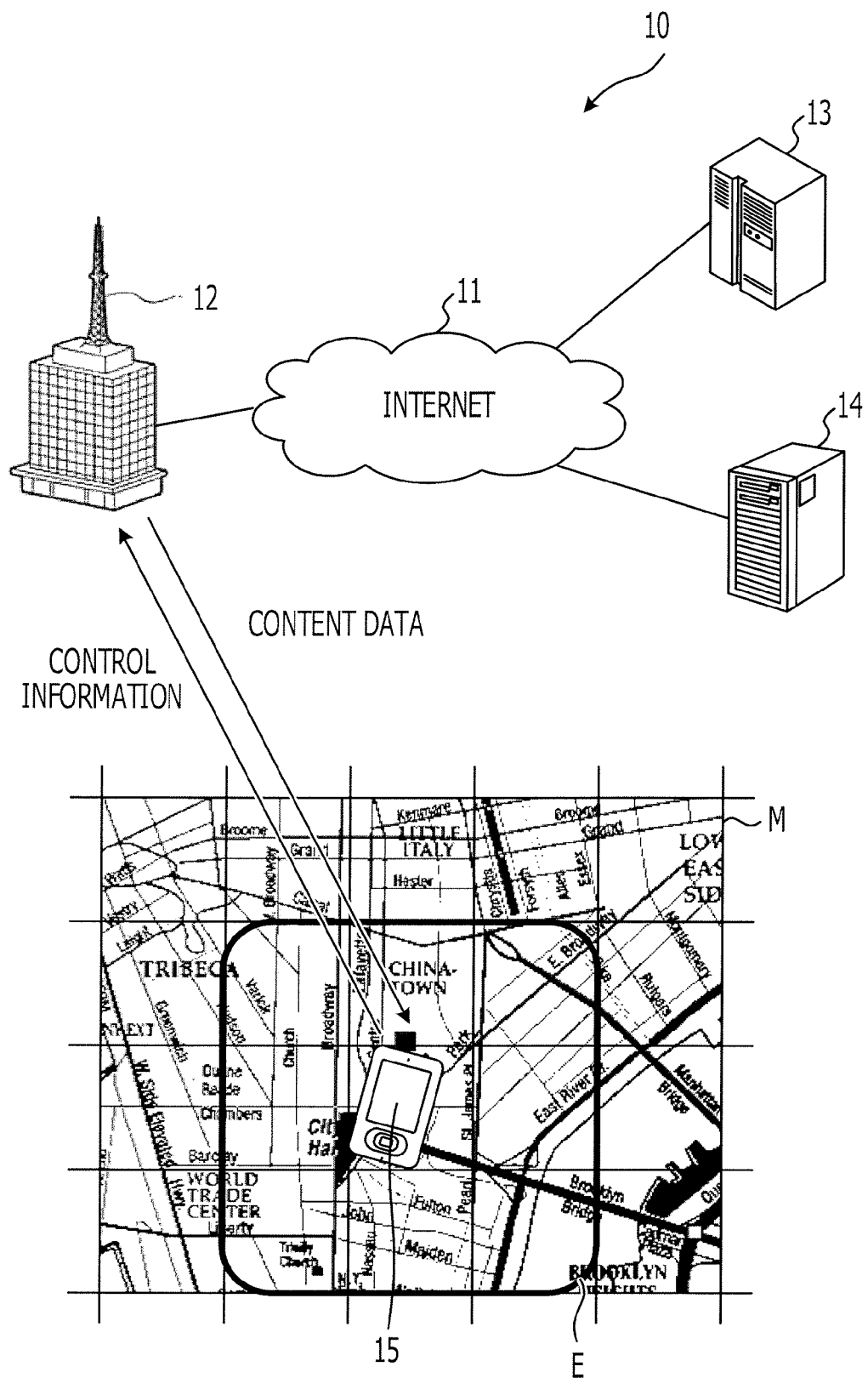
FIG. 1 illustrates an example of a configuration of a mobile communication system according to an embodiment.

Hereinafter, embodiments of the present disclosure will be described with reference to the accompanying drawings. The configurations in the below embodiments are illustrative, and the present disclosure is not limited to the configurations of the below embodiments.

While inventing the present embodiments, observations were made regarding a related art. Such observations include the following, for example.

Using technologies of the related art, access points of mobile terminals may be increased and the capacity (band) of the communication line that users use may be increased. However, it may be hard to change the distribution itself of user locations. For this reason, improvement in the frequency utilization efficiency in a desired area has not been able to be attained.

For example, one of the technologies of the related art for improvement in the frequency utilization efficiency in an area is a download control scheme (for example, Japanese Patent Application No. 2011-058287). When the download control scheme is performed, the path of travel of a mobile terminal is predicted, and, based on the prediction result about variations in communication quality in accordance with the path of travel and the size of data to be transmitted and received between the network and the mobile terminal, the timing of starting transmission and reception of data is determined. Therefore, it becomes possible for the mobile terminal to perform downloading, focusing on an area where radio quality is good. As a result, the frequency utilization efficiency improves.

In the above download control scheme, the intervals at which the position information is reported are typically set to be as long as possible in order to reduce the power consumption of a mobile terminal. For this setting, it is desired to accurately estimate the path of travel of the mobile terminal. Here, when a mobile terminal moves along a given route, like a train or a bus, estimation of the path is easy. On the other hand, estimation of the path is significantly difficult when a mobile terminal does not follow the established route. The lower the accuracy of the path estimation and the prediction of variations in radio quality, the lower the effects of download control.

Therefore, the present embodiments, for example, provide techniques capable of appropriately controlling the location at which a mobile terminal starts to perform communication.

In the present embodiments, description will be given of control (including download control) of the location where communication starts, which may be performed without estimation of the path of a mobile terminal and strict prediction of variations in radio quality. In particular, in the present embodiments, the location at which communication, including downloading, of a mobile terminal starts is controlled by permitting or prohibiting the start of communication based on statistical information obtained from one or more indices of radio quality at the current location of the mobile terminal and the surrounding area. The statistical information includes, for example, a frequency distribution, a density distribution, a probability distribution, a probability density distribution, a mean, a variance, a cumulative frequency, a cumulative frequency distribution, or the like. The statistical information is obtained, for example, a probability density function (PDF), a cumulative distribution function (CDF), or the like. Controlling the location at which the communication of a mobile terminal starts is equivalent to controlling the area in which the mobile terminal performs communication. Accordingly, by causing communication to start in a desirable area, improvement in the frequency utilization efficiency of the area may be attained.

First Embodiment

FIG. 1 illustrates an example of a configuration of a mobile communication system according to the embodiments. In FIG. 1, a mobile communication system 10 includes a base station (BS) 12 connected to the Internet 11, a server 13, and a content server 14. A mobile terminal (MT) 15 establishes wireless connection with the base station 12 in the cell of the base station 12 so as to be able to access the server 13 through the base station 12. By transmitting control information to the base station 12, the mobile terminal 15 is able to access the content server 14 through the base station 12 and receive (download) content data maintained by the content server 14. The Internet 11 is an example of a network. Note that although one base station 12 is illustrated in FIG. 1, the mobile communication system according to the embodiments includes a plurality of base stations that wirelessly connect to the mobile terminal 15 as the mobile terminal 15 moves.

The server 13 is a control server that performs download control of the mobile terminal 15. The server 13 holds a communication quality database. The communication database accumulates results of measurement of one or more indices of radio quality at a plurality of points (measurement points, sample points). Hereinafter, the one or more indices may be called as radio quality indices. The radio quality may also be represented as wireless quality. The radio quality indices are a signal to interference plus noise ratio (SINR) and a throughput, for example. However, radio quality indices other than the SINR and the throughput may be applied. Additionally, a single index may be used, and an index made up of a combination of a plurality of indices may also be used as the radio quality indices. The radio quality may be measured by a mobile terminal, a base station, or other devices at the plurality of points, and the radio quality or the one or more indices of the radio quality may be sent to the server 13.

The mobile terminal 15 has a location detection function such as a global positioning system (GPS) function, and notifies the server 13 of the current location of the mobile terminal 15 when a communication request event occurs at the mobile terminal 15. However, the mobile terminal 15 may transmit, to the server 13, information on the current location acquired from other devices such as the base station 12. Accordingly, it is not an indispensable requirement that the mobile terminal 15 is provided with a location detection function.

The server 13 identifies the evaluation area concerning the mobile terminal 15 from the current location of the mobile terminal 15. The evaluation area is the area surrounding the mobile terminal 15 determined based on the current location of the mobile terminal 15, for example. For example, the evaluation area is determined in such a manner as to be centered around the current location. The evaluation area is defined as a planar shape having a given size, such as a circle, an ellipse, a triangle, a quadrangle, or a polygon.

Alternatively, the evaluation area is formed by dividing the communication area of a mobile communication system into areas in a specified shape having a given size (such as, a triangle, a quadrangle, a hexagon, or an octagon). For example, a plurality of evaluation areas may be formed by dividing the communication area into a grid. Alternatively, the communication area is divided into a plurality of unit areas, and the evaluation area may be formed of a set of one or two or more unit areas. The evaluation area may also be formed of one unit area. Note that a plurality of evaluation areas statically created do not have to have the same area and the same shape, and a plurality of evaluation areas having different sizes and shapes may be defined.

FIG. 1 illustrates an evaluation area E formed in such a way that a communication area indicated by a map M is divided into a grid of squares, so that a plurality of unit areas are formed, and thus the evaluation area E is made up of a set of a plurality of unit areas so as to have a similar shape to a unit area. When using a grid, information on each evaluation area, including the area number, location, and size, may be registered in advance in the server 13. In this way, identification of an evaluation area is performed either in the case where the evaluation area is selected from a group of evaluation areas created in advance by formation of a grid or in the case where the evaluation area is dynamically identified focusing on the current location of the mobile terminal 15.

Having identified the evaluation area where the current location of the mobile terminal 15 belongs, the server 13 determines whether to perform assignment of wireless communication resources (communication assignment) to the mobile terminal 15, based on the feature values of the probability distribution of the radio quality in the evaluation area.

The probability distribution of radio quality (radio quality indices) uses the mean and the variance calculated from the probability density function (PDF) with respect to the radio quality indices at a plurality of measurement points (sample points) located in the evaluation area, for example. Although, in this embodiment, two statistical parameters, the mean and the variance, are used for making a determination as to communication assignment, three or more parameters may be used. Note that when a plurality of evaluation areas are created in advance, the calculation results of the mean and the variance of radio quality indices corresponding to the evaluation areas may be registered in advance in the server 13.

In accordance with a communication assignment determination table as illustrated in FIG. 2, the server 13 determines whether to perform communication (permission or prohibition to perform communication). In the example illustrated in FIG. 2, the means of radio quality indices are classified into two levels, "high" and "low", and the variances are classified into two levels, "large and "small". The thresholds for the means and the variances are given in advance, and the server 13 determines the levels of the means and the variances using the thresholds. Depending on the combination of the level of the mean with the level of the variance, the server 13 determines whether to perform communication assignment ("OK" or "NG").

Figure 3:
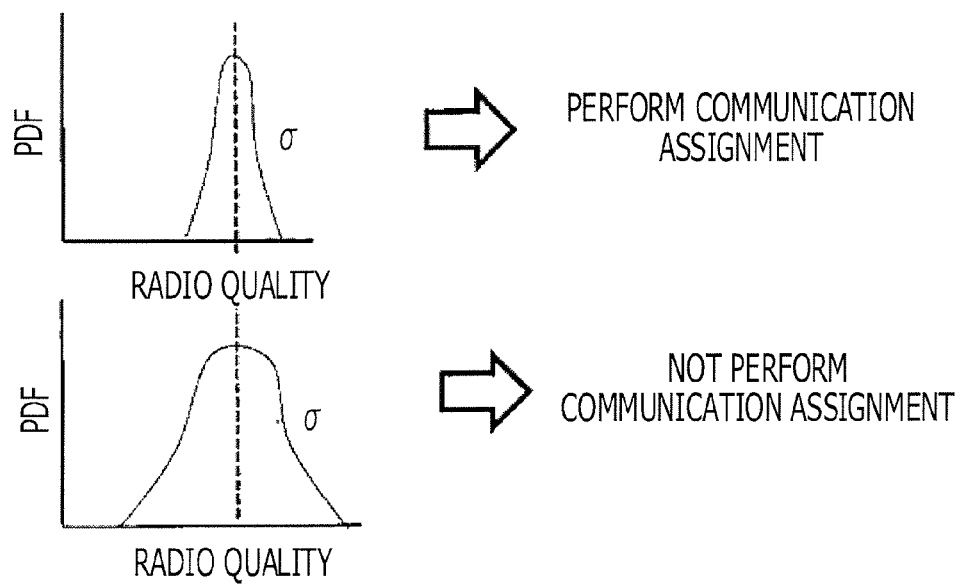
FIG. 3 explains determinations as to whether to perform communication and illustrates an example of determinations as to the communication assignment.

FIG. 3 illustrates an example of determinations as to the communication assignment. If, as illustrated in FIG. 2 and at the top of FIG. 3, the mean is high and the variance is small, the server 13 determines that wireless communication with high radio quality is possible within the evaluation area, independently of where the mobile terminal 15 is located, and performs communication assignment to the mobile terminal 15. In contrast, if, as illustrated in FIG. 2 and at the bottom of FIG. 3, the mean is high and the variance is large, the server 13 determines that the radio quality within the evaluation area is dependent on where the mobile terminal 15 is located (irregularities in radio quality occur at some locations), and does not perform communication assignment to the mobile terminal 15.

It is preferable that the results of the above determinations be applied to non-real-time communication in which communication does not have to be performed in real time. However, this embodiment is not inhibited from being applied to real-time communication. In the below description, the real-time communication in which communication has to be performed in real time is, for example, data communication in which services, such as voice over IP (VoIP), Web browsing, and the online games, have to be provided in real time to users. In contrast, the non-real-time communication is data communication to which some delay is acceptable, such as uploading of an operating system (OS) and downloading of electronic contents (electronic files including text files such as digital books, sound files, and video files).

The result of a determination as to whether to assign communication (permission or prohibition to perform communication) is transmitted to the mobile terminal 15. In the mobile terminal 15, when the result is "OK" and the communication request is a request for non-real-time communication, processing (such as a call) in accordance with the communication request is performed. In contrast, if the result is "NG" at the time of the communication request of non-real-time communication, processing compliant with the communication request is not performed.

Thereafter, the mobile terminal 15 periodically, or at regular intervals, inquires of the server 13 whether to perform communication assignment. Then, the mobile terminal 15 receives the result of "OK" when moving to an evaluation area where the mean of the radio quality indices is low and the variance is small. Thereby, the mobile terminal 15 performs non-real-time communication.

In such a way, according to the embodiment, whether to perform communication assignment is determined based on the distribution of communication assignment indices of the evaluation area. Thus, the mobile terminal 15 performs non-real-time communication in the evaluation area where the radio quality is stable at high levels.

As such, according to this embodiment, based on at least two feature values (the mean and the variance) obtained from the frequency distribution of the radio quality in the evaluation area, it is determined to permit the mobile terminal 15 to start communication or to prohibit the mobile terminal 15 from starting communication. In this way, the location at which non-real-time communication starts to be performed by the mobile terminal 15 may be controlled to be within an evaluation area where the radio quality is good. This enables the frequency utilization efficiency in the communication area to improve, without strictly predicting the path of travel and the radio quality of the mobile terminal 15. In general, an evaluation area where the mean of radio quality distribution is high and the variance is small is considered to be an area where the number of users is small. If non-real-time communication is able to be assigned in such an evaluation area where the number of users is small, it becomes possible to improve the frequency efficiency appropriately (for example, several times).

<Configuration Example of Mobile Terminal>

Figure 4:
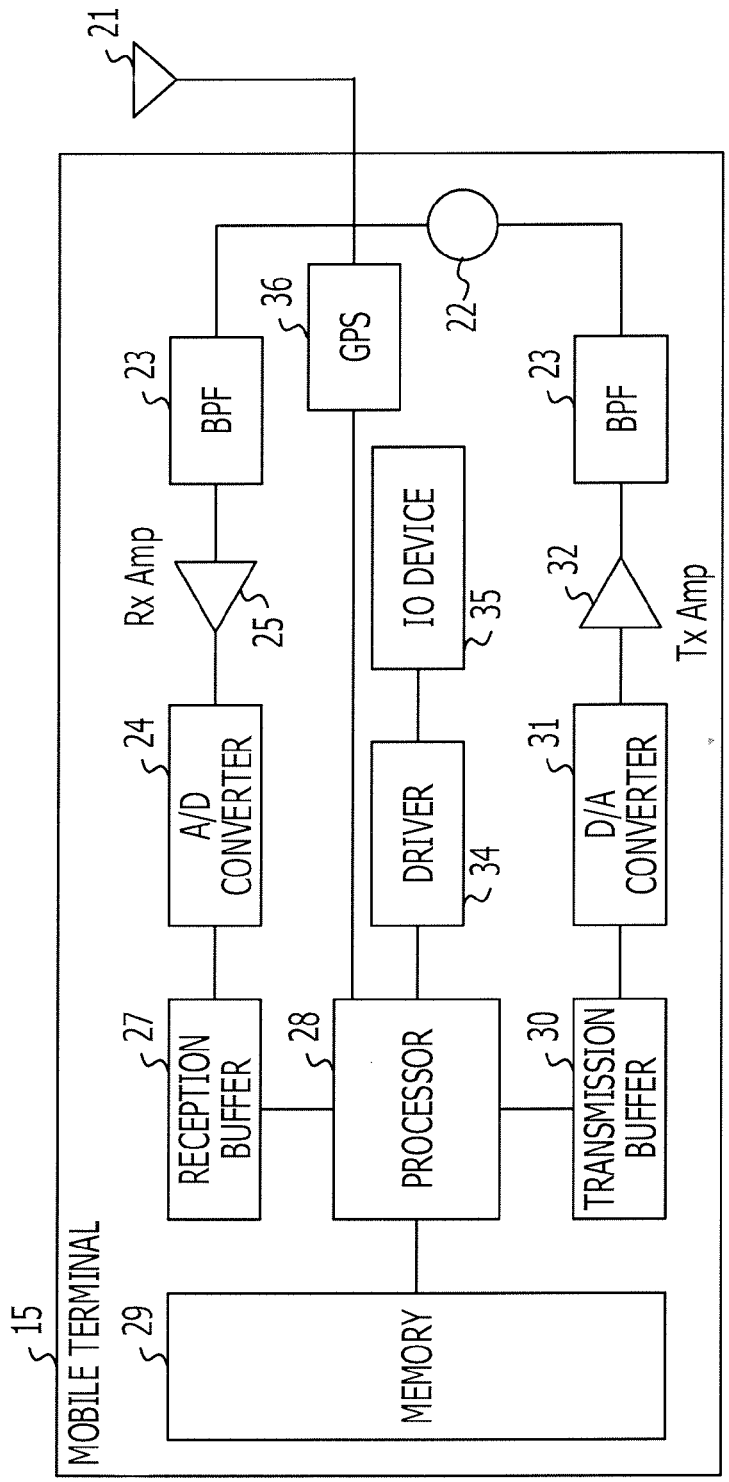
FIG. 4 illustrates an example of the configuration of a mobile terminal in the embodiment.

FIG. 4 illustrates an example of the configuration of the mobile terminal 15 in the embodiment. In FIG. 4, the mobile terminal 15 includes a reception system, a transmission system, and a control system. The reception system includes a transmission-and-reception antenna (receiving antenna) 21, a circulator 22, a band-pass filter (BPF) 23, a receiving amplifier (Rx Amp) 25, and an analog-to-digital converter (A/D converter) 24, and a reception buffer 27.

The transmission system includes a transmission buffer 30, a digital-to-analog converter (D/A converter) 31, a transmission amplifier (Tx Amp) 32, the BPF 23, the circulator 22, and the transmission-and-reception antenna (transmission antenna) 21.

The control system includes a processor 28 and a memory 29. The processor 28 is connected through a device driver (driver) 34 to an input/output (I/O) device 35. The I/O device 35 includes input devices (for example, a key, buttons, and a microphone) and output devices (a display device such as a liquid crystal display (LCD), and a speaker).

A radio signal received through the transmission-and-reception antenna 21 passes through the circulator 22 and is input to the BPF 23. The frequency band component corresponding to a given reception frequency is extracted by the BPF 23, is amplified by the receiving amplifier 25, and then is converted into a digital signal by the A/D converter 24. The digital signal is temporarily stored in the reception buffer 27.

In the transmission buffer 30, transmission data generated by the processor 28 is temporarily stored. The transmission data read from the transmission buffer 30 is converted into an analog signal by the D/A converter 31 and is amplified by the transmission amplifier 32. Thereafter, the analog signal passes through the BPF 23 and the circulator 22 and is transmitted from the transmission-and-reception antenna (transmission antenna) 21.

Note that the A/D converter 24, the D/A converter 31, and the driver 34 are implemented using an integrated circuit (IC), for example. The reception buffer 27 and the transmission buffer 28 are formed using the storage area of a storage device.

The processor 28 is a central processing unit (also referred to as a CPU or an MPU), a digital signal processor (DSP), or a combination of both, for example. The memory 29 is an example of a storage device (recording medium), and includes a main memory device (main memory) and an auxiliary storage device. The main memory includes a read only memory (ROM) and a random access memory (RAM). As the auxiliary storage device, at least one is chosen from among a hard disk, a flash memory, and an electrically erasable/programmable (EEP) ROM, for example.

The processor 28 loads programs stored in the auxiliary storage device into the main memory and executes the programs, thereby performing various processing and implementing various functions. For example, the processor 28 performs demodulation and decoding processing on digital data stored in the reception buffer 27 to acquire a desired data. The processor 28 also performs coding and modulation processing on data to be transmitted, and stores the generated data in the transmission buffer 30.

Also, through the interpretation of a signal input by an input device included in the I/O device 35, the processor 28 performs processing in accordance with an input signal. The processor 28 also creates display data for a display device using the memory 29, and performs display control of the display device. The processor 28 also performs sound processing concerning telephone calls.

Additionally, the mobile terminal 15 has a GPS receiver (GPS module) 36. The GPS receiver 36 includes an antenna that receives signals from a GPS satellite, an IC for RF processing, and an IC for baseband processing, and outputs the result of a position determination (position information) to the processor 28.

On a module received through the transmission-and-reception antenna 21, the processor 28 performs a process of calculating the current location of the mobile terminal 15 using an output signal from the GPS receiver 36 (a current location calculation process) and a process of determining the communication type in response to a communication request input by an operation of the I/O device 35 (input device).

<Configuration Example of Server>

Figure 5:
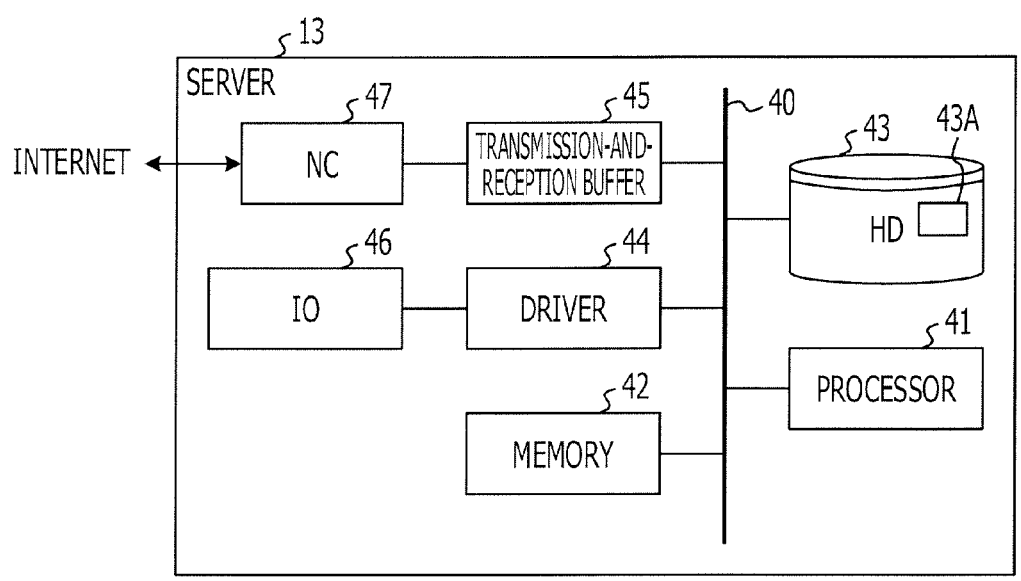
FIG. 5 illustrates an example of the configuration of a server in the embodiment.

FIG. 5 illustrates an example of the configuration of the server 13. A server is implemented using an exclusive server machine or a general-purpose information processing device (computer). In FIG. 5, the server 13 includes a processor 41, a memory 42, a hard disk (HD) 43, a device driver (driver) 44, and a transmission-and-reception buffer 45, which are mutually connected through a bus 40. The driver 44 is connected to an I/O device 46, and the transmission-and-reception buffer 45 is connected to a network controller (NC) 47. The NC 47 includes a network interface and is connected to the Internet 11 (FIG. 1).

The processor 41 is a central processing unit (also referred to as a CPU or an MPU), a digital signal processor (DSP), or a combination of both, for example. The memory 42 is a main memory including a ROM and a RAM and is used as workspace of the processor 41.

The hard disk 43 is an example of an auxiliary storage device, and stores at least programs executed by the processor 41 and a radio quality DB 43A. The radio quality DB 43A stores data (radio quality data) of radio quality indices measured in advance at a plurality of measurement points (sample points), as radio quality statistical data. The radio quality DB 43A also stores evaluation area calculating data. If an evaluation area is predefined, data that defines the size, shape, and location of the evaluation area, like the grid mentioned above, is stored. In contrast, when an evaluation area is identified based on the current location of the mobile terminal 15, data that defines the size and shape of the evaluation area is stored. Additionally, the radio quality DB 43A stores threshold data for the mean and the variance, as determination making data.

The I/O device 46 includes the input device and output device described above concerning the I/O device 35, and is controlled by the driver 44. The transmission-and-reception buffer 45 temporarily stores transmitted and received data. The NC 47 performs communication processing. A network interface card having a network interface is used with the NC. The driver 44 is made of, for example, an electronic circuit such as an IC. In addition, the transmission-and-reception buffer 44 is made of a storage device.

The processor 41 performs a determination process using the density distribution of radio quality for given communication (non-real-time communication in this embodiment) by executing the programs stored in the HD 43. In particular, the processor 41 performs processing for determining the location of the mobile terminal 15, processing for generating the density distribution of radio quality, and processing for determining thresholds for the mean and the variance. The processor 41 is also capable of making a determination for each communication type.

<Processing Flow>

Figure 6:
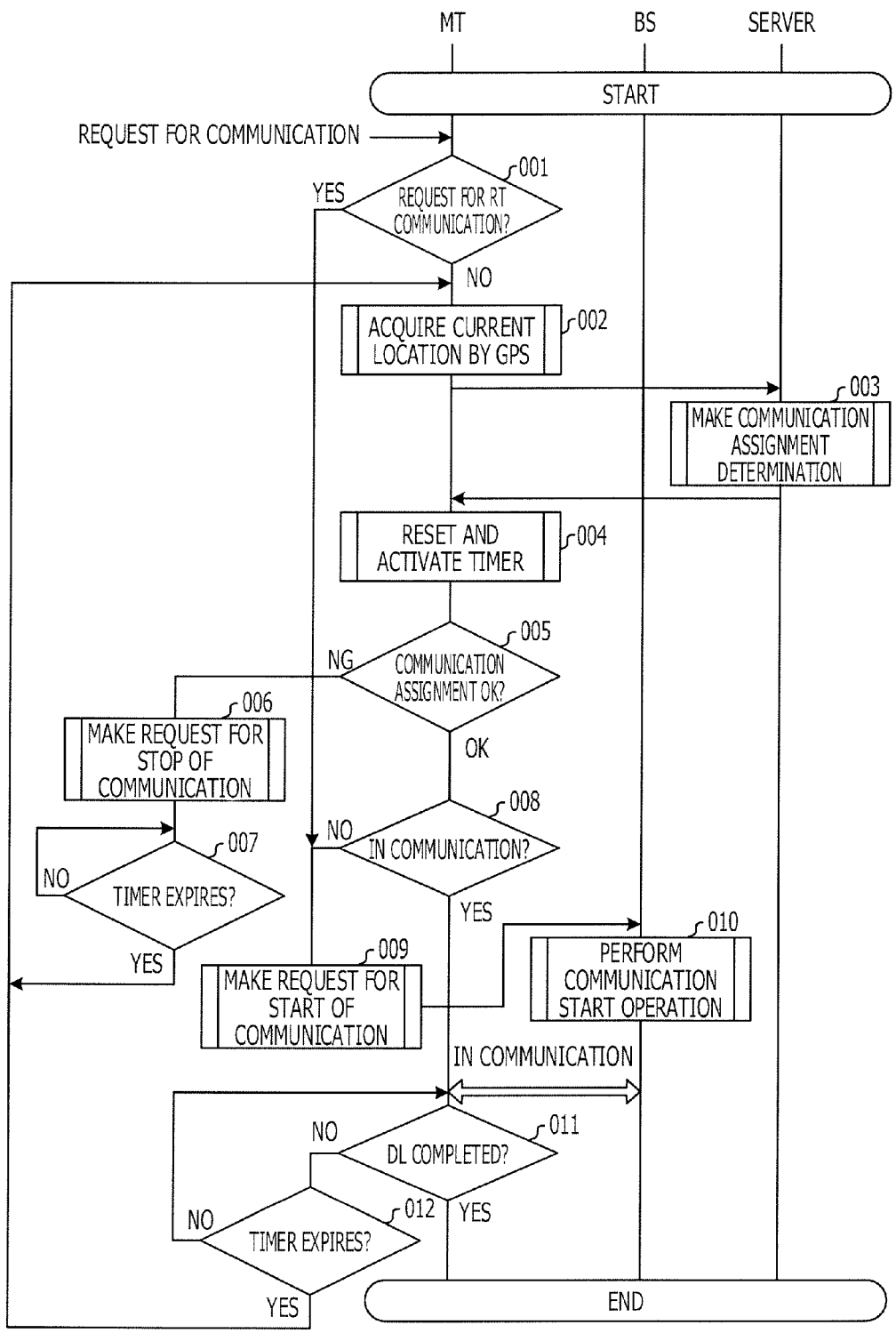
FIG. 6 illustrates a processing flow of a mobile terminal, a base station, and a server in the embodiment.

FIG. 6 illustrates an example of the processing flow of the mobile terminal 15 (MT), the base station 12 (BS), and the server 13 (SERVER). With reference to FIG. 6, when a request for communication is input (a communication request event starts) by the operation of the I/O device 35 of the mobile terminal 15, the processor 28 of the mobile terminal 15 determines whether the request for communication is a request for real-time (RT) communication (001). At this point, if the request for communication is a request for RT communication, the process proceeds to step 009. If not, the process proceeds to step 002.

At step 002, the processor 28 performs an operation of acquiring the current location of the mobile terminal 15 by using the GPS receiver 36. The current location is transmitted through the base station 12 (BS) and the Internet 11 to the server 13. Upon receipt of the current location, the server 13 performs a process of determining communication assignment (hereinafter also referred to as a "communication assignment determination process") (003).

Figure 7:
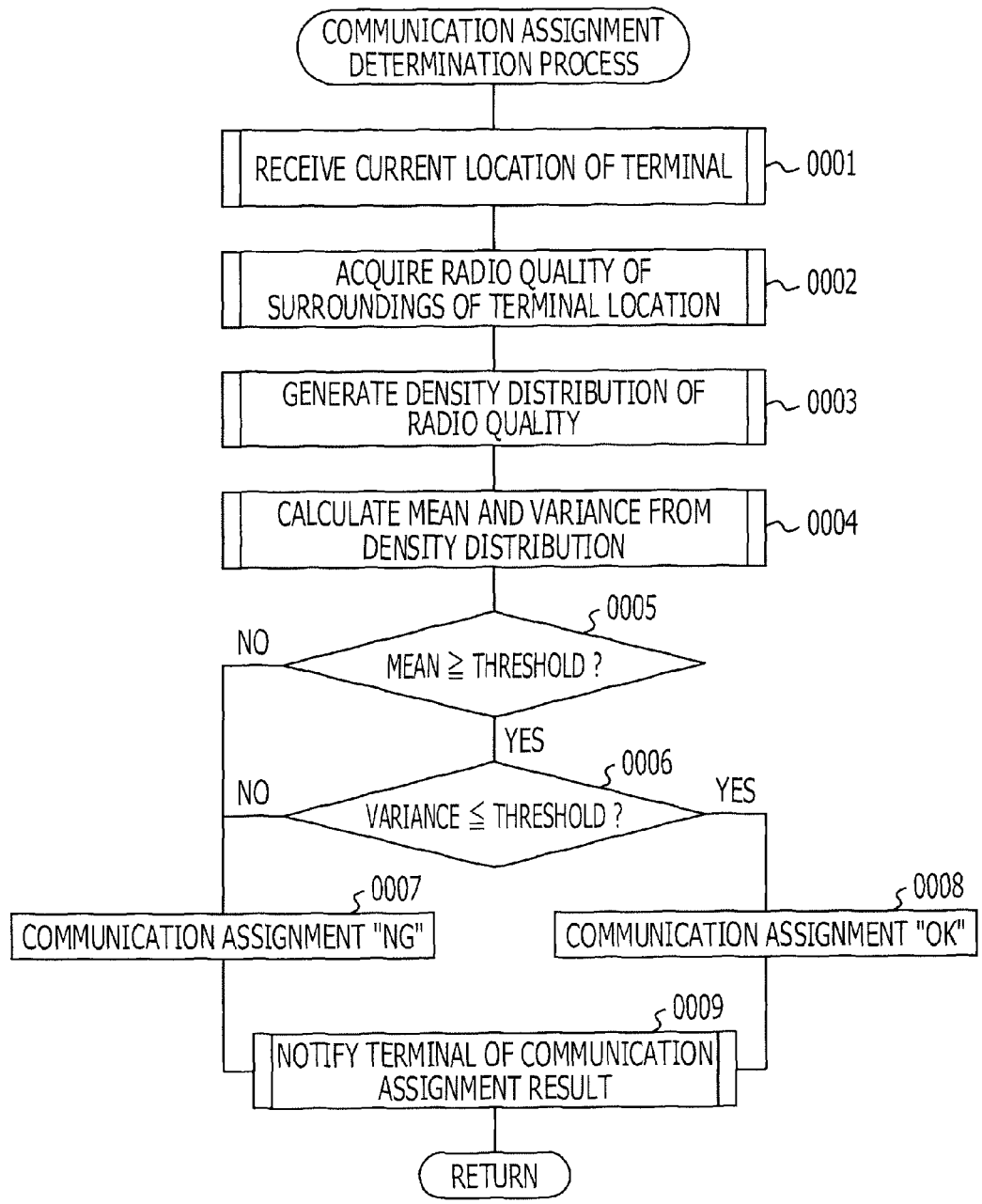
FIG. 7 illustrates an example of the processing of a communication assignment determination process.

FIG. 7 illustrates an example of the processing of the communication assignment determination process. With reference to FIG. 7, at step 0001, the processor 41 of the server 13 receives the current location at which communication is being performed by the mobile terminal 15. Subsequently, the processor 41 acquires radio quality data on the surroundings of the current location of the mobile terminal 15. That is, the processor 41 accesses the radio quality DB 43A of the hard disk 43, and identifies the evaluation area using evaluation area calculating data.

At this point, if the evaluation area calculating data includes data of a plurality of predefined evaluation areas, an evaluation area to which the current location of the mobile terminal 15 belongs is selected, so that the evaluation area is identified. In contrast, if the evaluation area is dynamically created, the processor 41 identifies a given area centered around the current location of the mobile terminal 15 as the evaluation area, using data regarding the size and shape of the evaluation area included in the evaluation area calculating data. Subsequently, the processor 41 acquires radio quality data by extracting the radio quality index values of a plurality of sample points belonging to the evaluation area.

Then, the processor 41 generates the density distribution of radio quality. That is, using radio quality data, the processor 41 calculates the PDF and calculates the mean and the variance of radio quality indices (0003).

Then, the processor 41 compares statistical information (the mean and the variance) with thresholds for the mean and the variance, and determines whether to perform communication assignment. That is, the processor 41 determines whether the mean is equal to or greater than the threshold (0005). If the mean is less than the threshold, the processor 41 determines that communication assignment is "NG" (0007). If the mean is equal to or greater than the threshold, then the processor 41 determines whether the variance is equal to or less than the threshold (0006). If the variance is equal to or less than the threshold, the processor 41 determines that communication assignment is "OK" (0008). Otherwise, if the variance exceeds the threshold, the processor 41 determines that communication assignment is "NG" (0007). Note that the operation of step 0005 and the operation of step 0006 may be performed in inverse order.

In this way, whether to perform communication assignment is determined depending on the levels of the mean and the variance as illustrated in the table of FIG. 2. Then, the processor 41 sends the communication assignment result (OK or NG) through the Internet 11 and the base station 12 to the mobile terminal 15 (0005).

Referring back to FIG. 6, upon receipt of the communication assignment result, the processor 28 of the mobile terminal 15 resets a timer, which is not illustrated, and starts to measure a given period of time (004). Then, the processor 28 determines whether the communication assignment result is "OK". If the result is NG, the process proceeds to step 006. Otherwise, if the result is OK, the process proceeds to step 008.

At step 006, the processor 28 performs an operation of making a request that communication be stopped. That is, the processor 28 suspends the operation of starting communication in response to a request for communication. Then, the processor 28 waits for expiration of the timer (007). When the timer expires, the processor 28 returns the process to step 002, and performs again the operations of step 002 to step 005. In this way, loop processing from step 002 to step 005 is repeated until the current location of the mobile terminal 15 moves to the evaluation area where the communication assignment result "OK" is able to be received.

At step 005, if it is determined that the communication assignment result "OK" is obtained, then the processor 28 determines whether the mobile terminal 15 is in communication with the base station 12 (008). If the mobile terminal 15 is not in communication with the base station 12, the process proceeds to step 009. If the mobile terminal 15 is in communication with the base station 12, the process proceeds to step 011.

In the case where the request for communication is a request for RT communication, the process proceeds from step 001 to step 009. In this case, at step 009, a request for start of communication for RT communication (a request for calling) is transmitted from the mobile terminal 15 to the base station 12. The base station 12 performs an operation of starting communication (calling) in response to the request for start of communication (010). Thus, the mobile terminal 15 is able to perform RT communication.

In the case where the request for communication is a request for non-real-time communication, the process proceeds from step 008 to step 009. Also in this case, a request for start of communication for non-real-time communication is transmitted to the base station 12 (009), and the base station 12 performs the operation of starting communication (010). Thus, the mobile terminal 15 is able to access the content server 14 and download an electronic file, for example.

If, at step 008, the mobile terminal 15 is in communication with the base station 12, then it is determined whether downloading (DL) is completed (011). If DL is not completed at this point, the process proceeds to step 012. At step 012, it is determined whether the timer expires, and if the timer expires, the process returns to step 002. Otherwise, if not, the loop of step 011 and step 012 is repeated until the timer expires. Then, when the downloading is completed (YES at step 011), the process ends. In this way, if the mobile terminal 15 is in communication with the base station 12, the operation of downloading is repeated until DL concerning that communication is completed or the timer expires. In contrast, in the case where the communication being made is real-time communication, the operation of downloading is repeated until downloading is completed, which is not illustrated.

Note that, in the above process, the mobile terminal 15 may transmit the communication type, together with the current location, to the server 13, and the server 13 may perform the process illustrated in FIG. 7 only when the communication type is non-real-time communication. Additionally, the mobile terminal 15 may receive a notification from the server 13 only when the communication assignment is "OK", and it may be determined that the communication assignment is "NG" when the communication assignment "OK" is not able to be received.

According to the first embodiment, download control may be performed so that a desired area is the area where non-real-time communication is performed by the mobile terminal 15. At this point, highly accurate prediction of the direction of travel of the mobile terminal 15 is not desired. Accordingly, with a simple configuration, non-real-time communication performed by the mobile terminal 15 may be distributed among places where the amount of traffic is relatively small or where traffic is available. Accordingly, it becomes possible to attain effective use of frequencies.

Second Embodiment

A second embodiment will be described next. The second embodiment has features in common with the first embodiment, and therefore differences from the first embodiment are mainly described and description of the common features is omitted.

Figure 8:
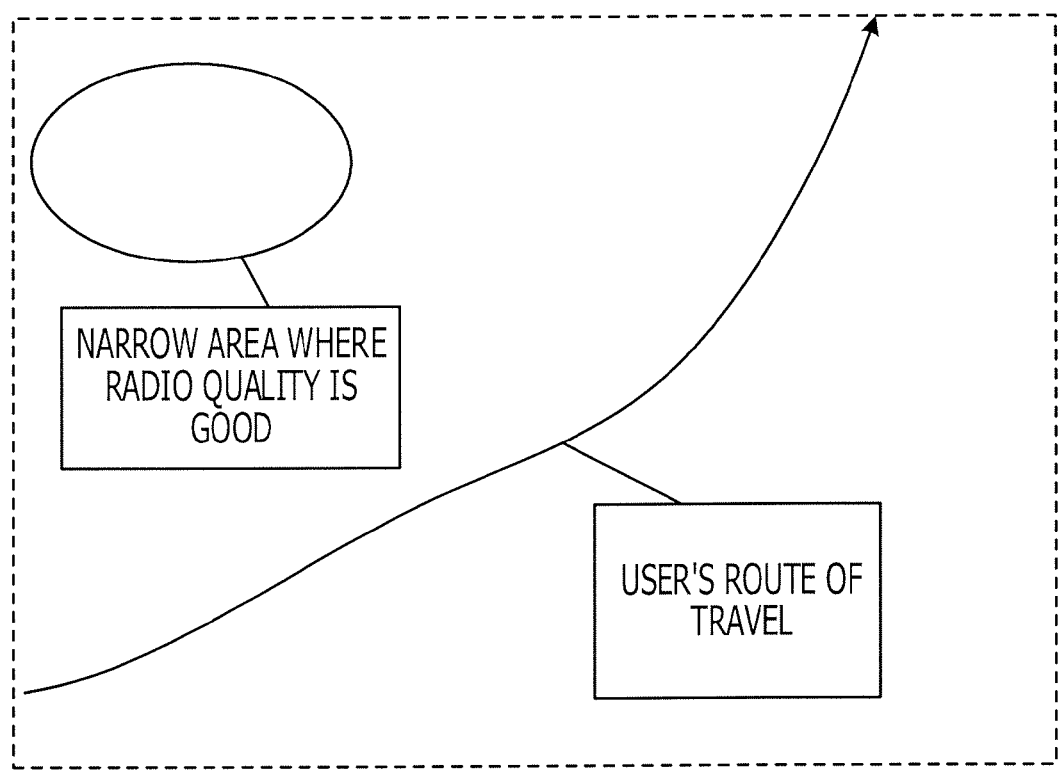
FIG. 8 illustrates a state in which a narrow area where the radio quality is good partially exists in an evaluation area.
Figure 9:
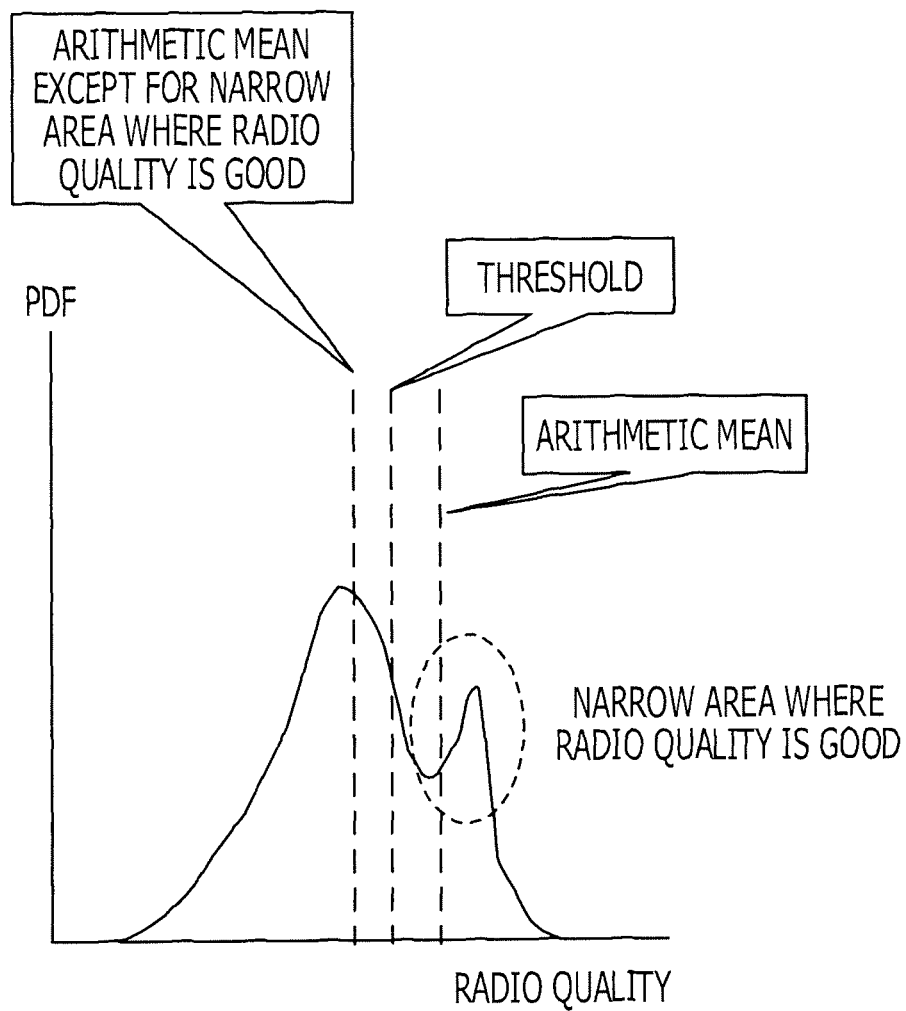
FIG. 9 is a graph for explaining a second embodiment.

FIG. 8 illustrates a state in which a narrow area where the radio quality is good partially exists in the evaluation area. In this case, if the probability density distribution (PDF) in the evaluation area is simply calculated, the PDF is presented as in the graph illustrated in FIG. 9 under the influence of the narrow area mentioned above. That is, the arithmetic mean value is affected by the radio quality of the narrow area, and is equal to or larger than a threshold. Therefore, it is determined that communication assignment is "OK". The determination of communication assignment "OK", however, is not preferable for such an evaluation area.

Figure 10:
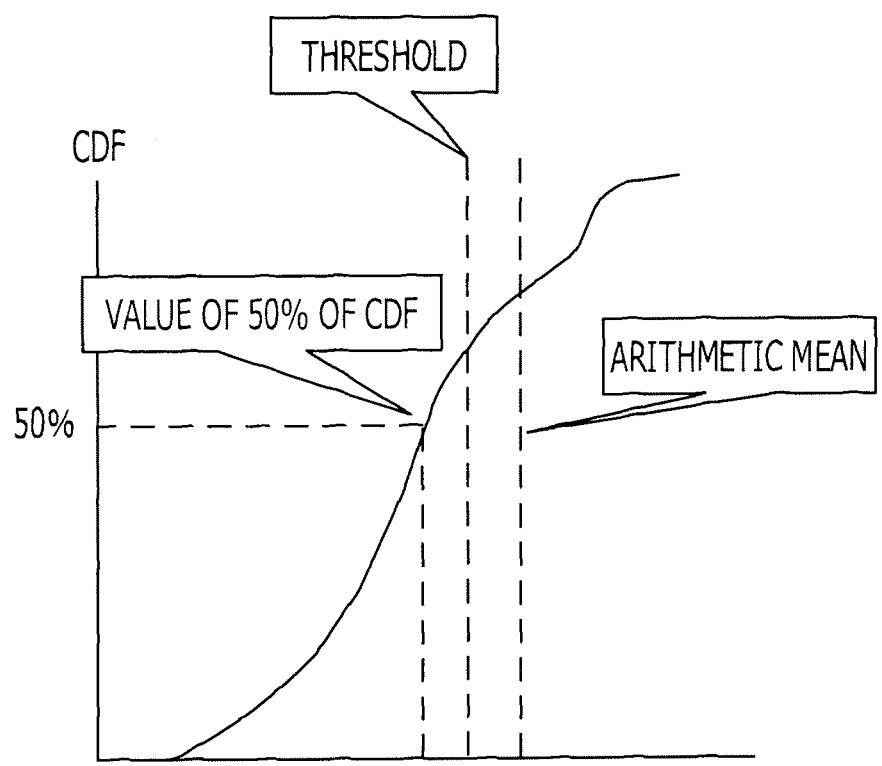
FIG. 10 is a graph for explaining the second embodiment.

In the second embodiment, in order to make a determination as to communication assignment, a cumulative frequency distribution (CDF) is generated from the probability density distribution of radio quality, and the value of n % (n being a natural number excluding zero) of the cumulative frequency distribution is compared with a threshold. For example, n is set to 50 (50%). However, the value of n may be set up appropriately. FIG. 10 is a graph illustrating that, for the example illustrated in FIG. 9, the value of 50% of the CDF is obtained from the arithmetic mean value and a comparison of the value with the threshold.

As illustrated in FIG. 10, the value of 50% of the CDF is a value smaller than the threshold. Accordingly, it is avoidable that communication assignment is performed for an evaluation area locally having an area where the radio quality is good as illustrated in FIG. 8. This makes it possible to make a determination as to whether to perform communication assignment in such a manner that the original radio quality distribution of the evaluation area is accurately reflected in the determination, without the influence of the narrow area where the radio quality is good.

Figure 11:
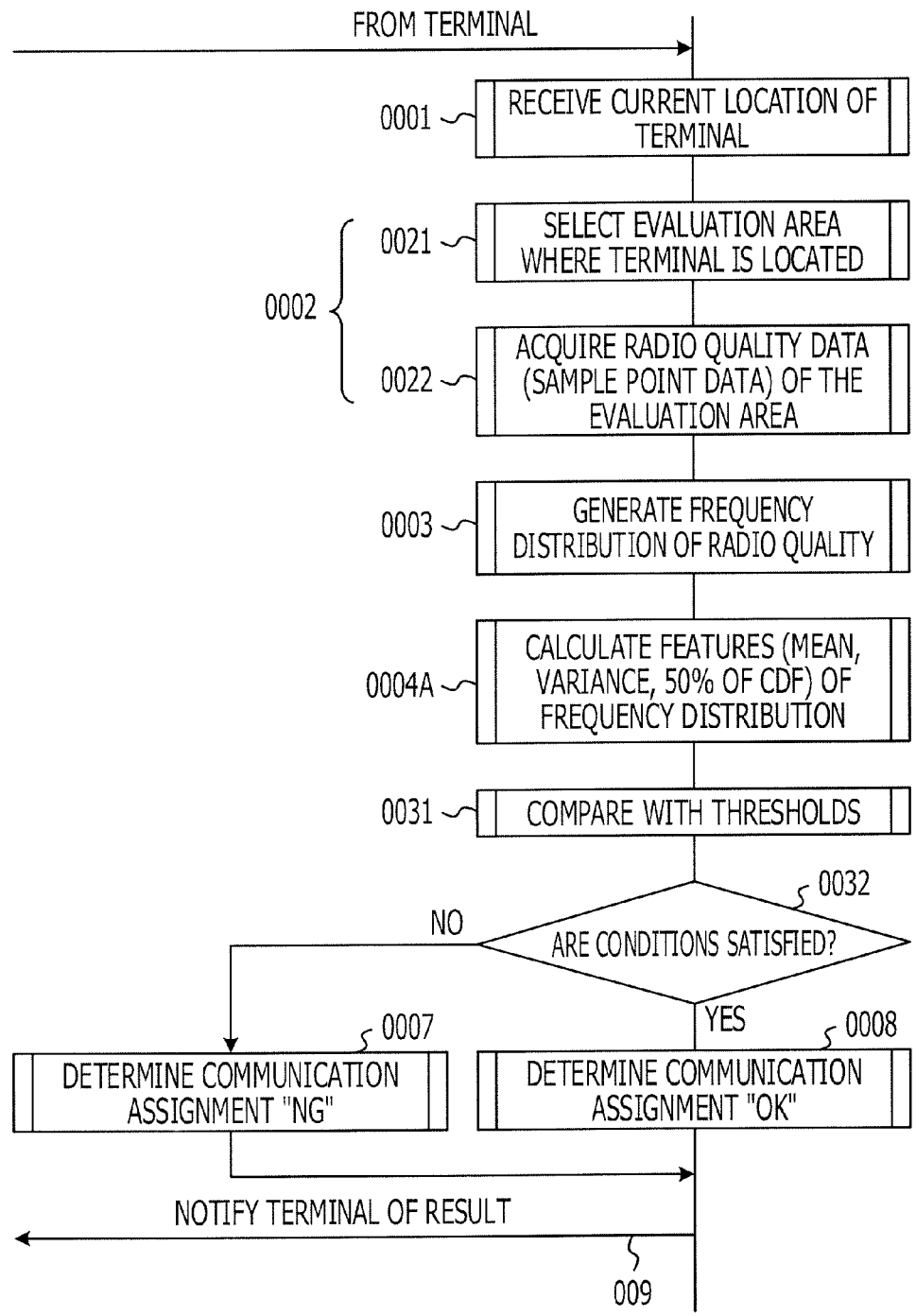
FIG. 11 is a flowchart illustrating a first example of the communication assignment determination process in the second embodiment.

FIG. 11 is a flowchart illustrating a first example of the communication assignment determination process of the server 13 in the second embodiment, and illustrates an example of the case where the server 13 has data of a plurality of predefined evaluation areas (for example, the case where the communication area is divided by a grid). Among operations illustrated in FIG. 11, the same operations as in the first embodiment (FIG. 7) are denoted by the same reference numerals.

In FIG. 11, at step 0001, the processor 41 of the server 13 receives the current location of the mobile terminal 15. Subsequently, the processor 41 creates the evaluation area corresponding to the current location of the mobile terminal 15, as the operation equivalent to the operation at step 0002 of FIG. 7. That is, the processor 41 accesses the radio quality DB 43A of the hard disk 43, and selects an evaluation area to which the current location belongs, from a plurality of evaluation areas included in the evaluation area calculating data (0021).

Subsequently, the processor 41 acquires the radio quality data of the selected evaluation area from the radio quality DB 43A (0022). Then, the processor 41 generates the frequency distribution (density distribution) of the radio quality (0003), and calculates the features (the mean and the variance) of the frequency distribution (0004A). At this point, the processor 41 calculates cumulative frequency distribution and calculates the value of n % of the CDF (for example, n=50).

Then, the processor 41 performs an operation of comparison with thresholds (0031), and makes a determination as to whether the conditions for determining that the communication assignment is "OK" are satisfied (0032). The operations of step 0031 and step 0032 are basically the same as those of step 0005 and step 0006 illustrated in FIG. 7. However, in a determination as to the threshold concerning the mean, the value of n % of the CDF (referred to as a "mean correction value") is used rather than the mean.

If the conditions are satisfied (YES at step 0032), the processor 41 determines that the communication assignment is "OK" (0008). Otherwise, if the conditions are not satisfied, it is determined that the communication assignment is "NG" (0007). Thereafter, the determination result is transmitted to the mobile terminal 15 (0009).

Note that, in the example of processing illustrated in FIG. 11, an example where the frequency distribution, the mean, the variance, and the mean correction value are calculated is illustrated. Instead of this, the mean, the variance, and the mean correction value for each evaluation area may be stored in advance in the radio quality DB 43A. In this case, the calculation operations mentioned above are replaced with an operation of reading the data stored in advance.

Figure 12:
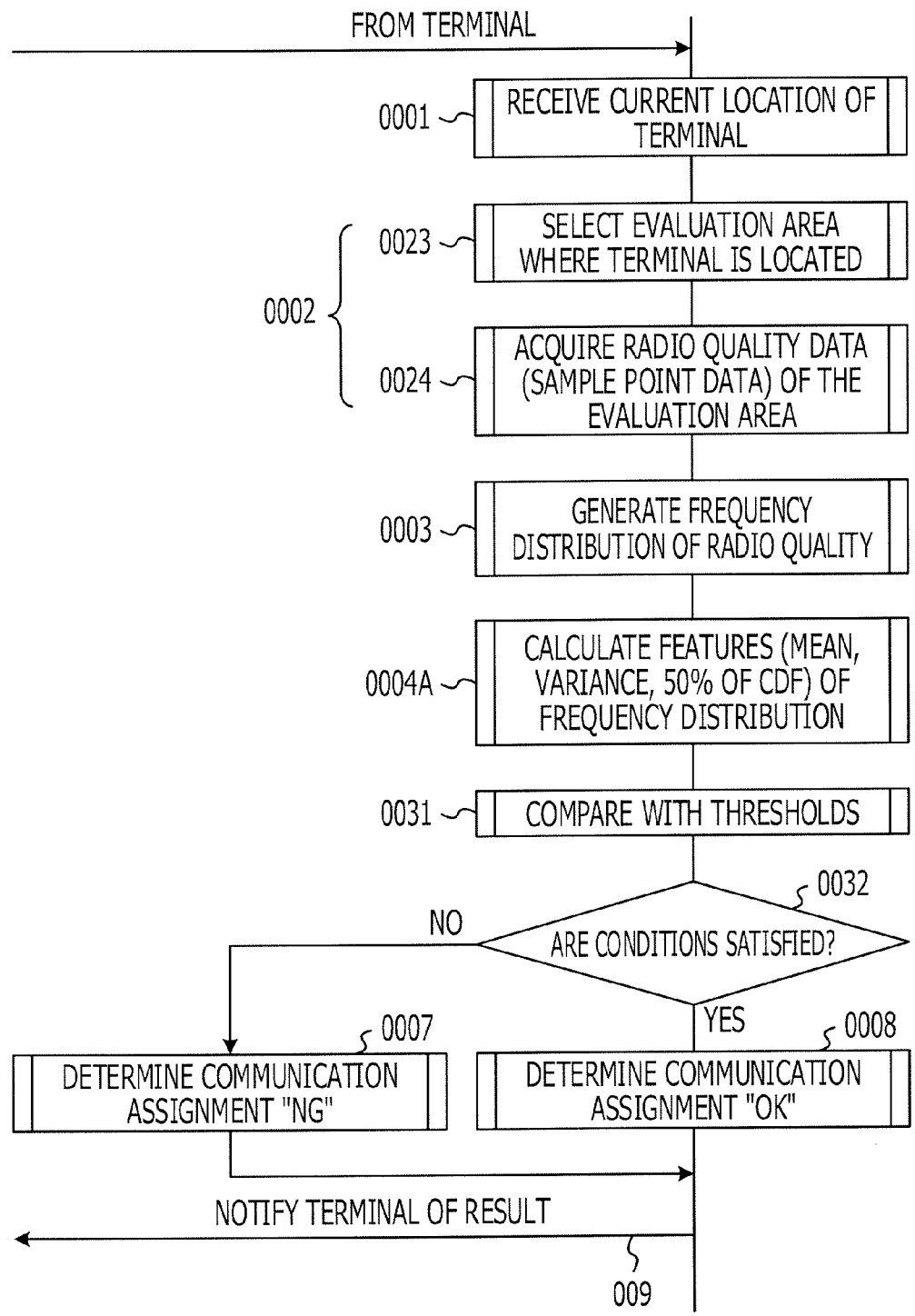
FIG. 12 is a flowchart illustrating a second example of the communication assignment determination process in the second embodiment.

FIG. 12 illustrates a second example of the communication assignment determination process of the server 13 in the second embodiment, and illustrates an example of the case where the server 13 does not have data of a plurality of predefined evaluation areas.

Among operations illustrated in FIG. 12, the operations of step 0023 and step 0024 are different from those illustrated in FIG. 11. That is, at step 0023, the processor 41 accesses the radio quality DB 43A of the hard disk 43, and generates an evaluation area to which the current location belongs (for example, an evaluation area centered around the current location) using data regarding the size and shape of the evaluation area included in the evaluation area calculating data.

Subsequently, the processor 41 acquires the radio quality index values of a plurality of sample points belonging to the evaluation area from the radio quality DB 43A, thereby acquiring the radio quality data of the evaluation area (0024). The operations after step 0024 are the same as in FIG. 11, and therefore description of them is omitted.

According to the second embodiment, the communication assignment determination process with higher accuracy may be performed as compared with the first embodiment.

Third Embodiment

A third embodiment will be described next. The third embodiment has features in common with the first and second embodiments, and therefore differences from the first and second embodiments are mainly described and description of the common features is omitted.

In the third embodiment, the width of the area for creating the probability density distribution (PDF) is changed in accordance with the speed of travel and the direction of travel of the mobile terminal 15.

Figure 13:
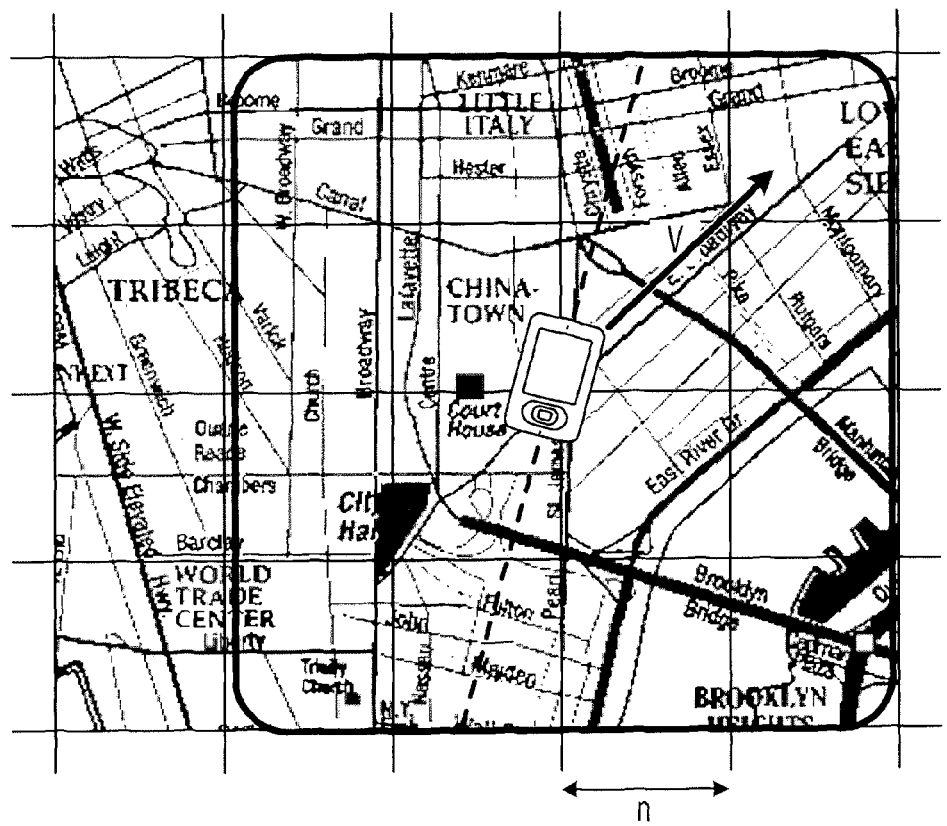
FIG. 13 illustrates a third embodiment.

FIG. 13 illustrates an example of the case where a plurality of areas (referred to as "unit areas") obtained by dividing a communication area by formation of a grid having a given width are defined. Here, assuming that the speed of the mobile terminal 15 is v, and the length of one side of a unit area (a square is illustrated in FIG. 13) is n, the faster the speed v of the mobile terminal 15, the shorter the period of time taken for passing though one unit area.

In order to accurately reflect the statistical information on the radio quality at the current location of the mobile terminal 15, it is desired that each time the mobile terminal 15 passes through some evaluation area, the statistical information on the radio quality in the next evaluation area be generated, and a determination as to communication assignment be made.

In this case, it is preferable that the faster the speed v of the mobile terminal 15, the more the frequency with which the server 13 is notified of the position information. However, considering consumption of the battery of the mobile terminal 15 (the power consumption of the mobile terminal 15), it is preferable that the frequency with which the current location is transmitted to the server 13 be reduced as much as possible. From such a viewpoint, it is preferable that the evaluation area for generating the statistical information on the radio quality be large to some extent. In contrast with this, if the speed v of the mobile terminal 15 is slow, the evaluation area does not have to be large.

Here, in the third embodiment, for example, in the example illustrated in FIG. 13, the limiting speed with respect to the length n of one side of a unit area is determined in advance using a computer simulation, an experiment, or the like, and the lengths of one side of the evaluation area are associated with a plurality of speed levels. That is, it is assumed that the length of one side of the evaluation area be an integral multiple of one side of each of a plurality of unit areas. That is, the evaluation area described in the third embodiment is the area of a square made up of a set of unit areas.

FIG. 14 illustrates an example of a correspondence table between the speed v of the mobile terminal 15 and the length of one side of the evaluation area. In FIG. 14, the speed v is $v_5 > v_4 > v_3 > v_2 > v_1 \geq 0$, and positive integers a to e are $e \geq d \geq c \geq b \geq a > 0$.

In the third embodiment, the intervals of location information notification corresponding to a plurality of levels of the speed of travel v are predefined. The interval is determined in advance using a computer simulation or an experiment, for example.

FIG. 15 illustrates an example of a correspondence table between the speed of travel v of the mobile terminal 15 and the length of an interval of location information notification. In FIG. 15, the speed v is $v_5 > v_4 > v_3 > v_2 > v_1 \geq 0$. The positive integers a to e in FIG. 15 are $e \geq d \geq c \geq b \geq a > 0$, and s denotes a unit period of time. The correspondence tables illustrated in FIG. 14 and FIG. 15 are stored in advance in the hard disk 43 (FIG. 5) or the radio quality DB 43. The integers a to e of FIG. 14 do not have to be the same values as the integers a to e of FIG. 15.

Figure 16:
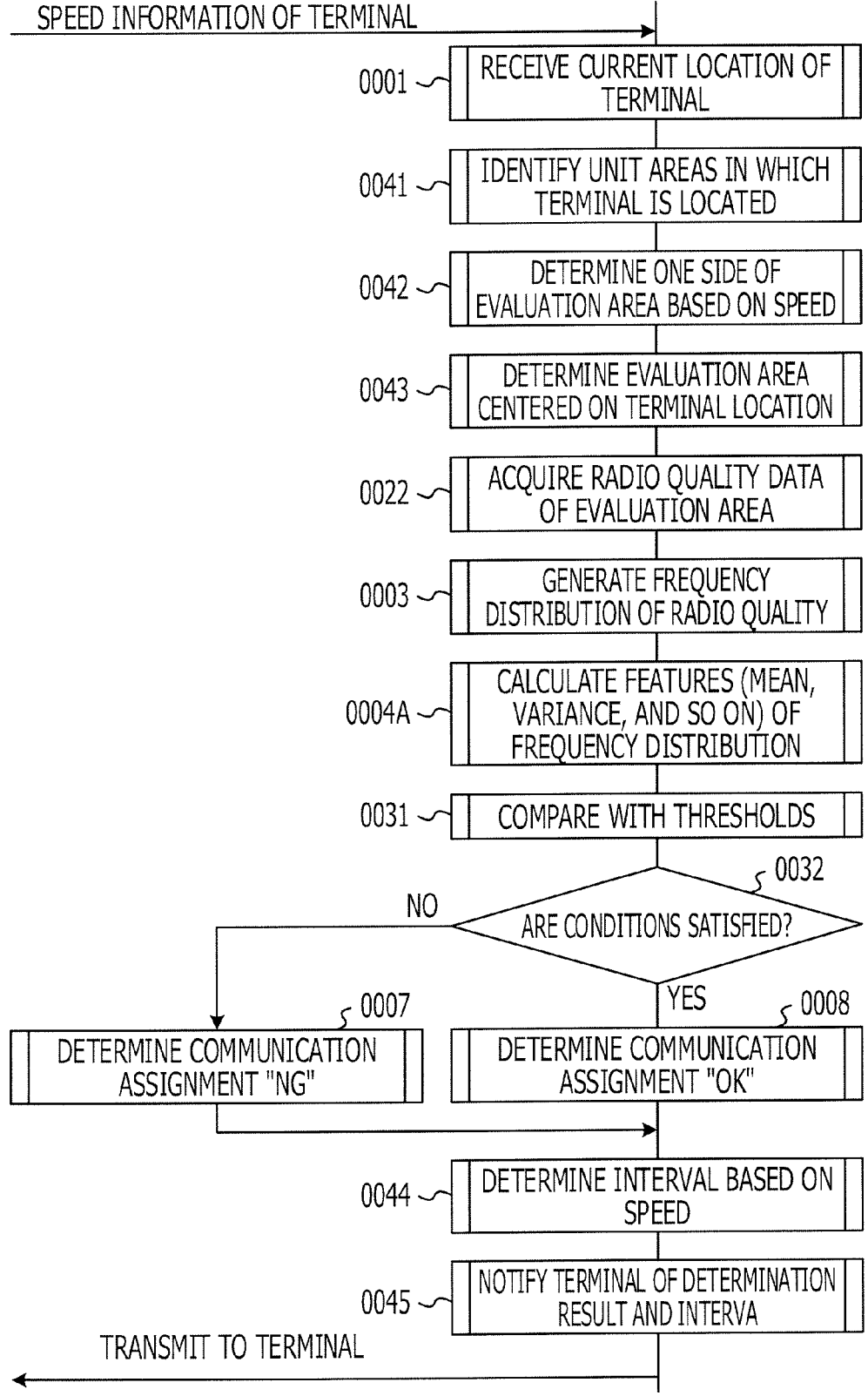
FIG. 16 is a flowchart illustrating an example of the communication assignment determination process in the third embodiment.

FIG. 16 is a flowchart illustrating an example of the communication assignment determination process in the third embodiment. The process illustrated in FIG. 16 includes features in common with the process of the second embodiment (FIG. 11), and therefore differences from the process of the second embodiment are described. However, the calculation and application of the mean correction value (the value of n % of the CDF) are not indispensable requirements in the third embodiment. This is the same in a fourth embodiment described later.

As illustrated in FIG. 16, in the third embodiment, the server 13 receives the speed of travel (speed v) of the mobile terminal 15 together with the current location from the mobile terminal 15. The speed v may be determined from the current location and the previously current location, for example.

The process of FIG. 16 differs from the process of FIG. 11 as follows. That is, at step 0041, the processor 41 identifies unit areas in which the mobile terminal 15 is located, and determines one side of the evaluation area based on the speed v and the correspondence table (FIG. 14) (0042). Then, the processor 41 determines an evaluation area that is centered around the current location of the mobile terminal 15 and has the determined length of one side (0043). Then, the processor 41 acquires the radio quality data for the evaluation area (0044).

The subsequent operations performed until a determination as to communication assignment is made are the same as in FIG. 11. If, at step 0007 or step 0008, the result of a determination as to communication assignment is obtained, the processor 41 determines the interval (cycle) of location information notification corresponding to the speed v based on the speed v and the correspondence table (FIG. 15) (0044). Then, the processor 41 sends the determination result and the interval to the mobile terminal 15 (0045).

According to the third embodiment, communication assignment may be determined with the evaluation area having a size in accordance with the speed of travel of the mobile terminal 15. Also, the determination as to communication assignment may be made in cycles (at intervals) in accordance with the speed of travel of the mobile terminal 15.

Fourth Embodiment

Figure 17:
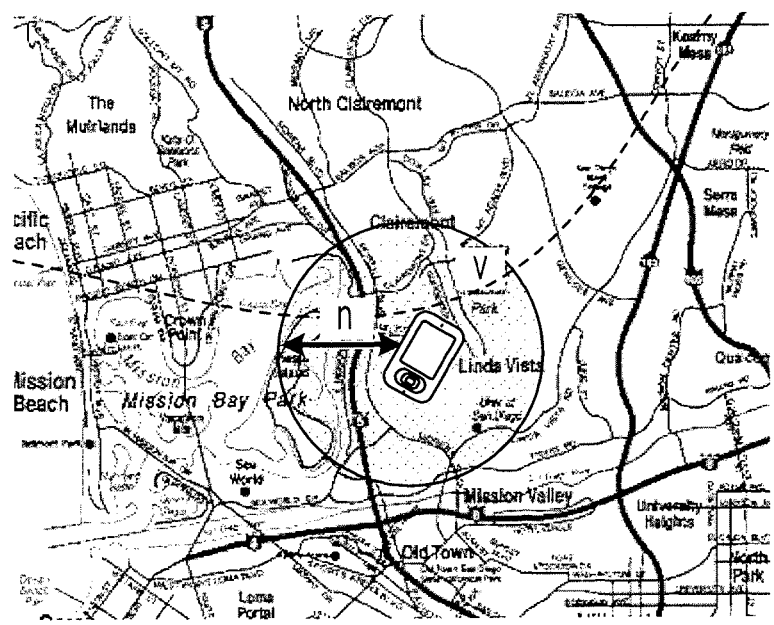
FIG. 17 illustrates a fourth embodiment.

A fourth embodiment will be described as a modification of the third embodiment. In the fourth embodiment, the unit area described in the third embodiment is not defined. For example, in the third embodiment, at the point of time at which the server 13 receives the current location and the speed of travel v from the mobile terminal 15, the circular evaluation area that is centered around the current location of the mobile terminal 15 and has a radius n (n being a natural number excluding zero) is created (with reference to FIG. 17), and the probability density distribution based on the data on radio quality in that evaluation area is calculated.

The radius n may be determined using the table illustrated in FIG. 14. In this case, "the length of one side of the evaluation area" of FIG. 14 is regarded as "the radius of the evaluation area". Note that the shape of the evaluation area is not limited to a circle. For example, a rectangular (preferably square) evaluation area made up of a set of unit areas as described in the third embodiment may be defined.

Figure 18:
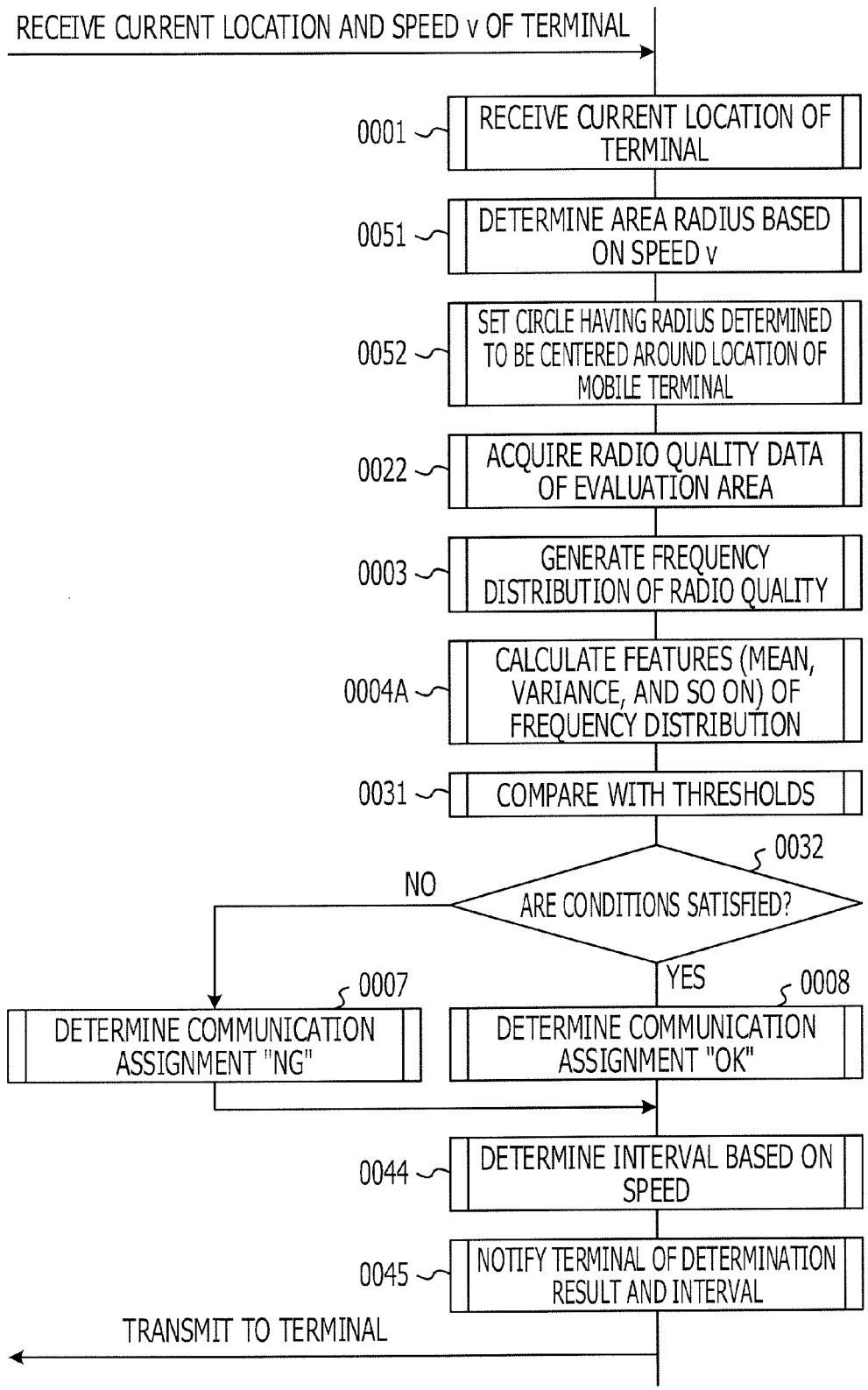
FIG. 18 is a flowchart illustrating an example of the communication assignment determination process in the fourth embodiment.

FIG. 18 is a flowchart illustrating an example of the communication assignment determination process in the fourth embodiment. The operations of FIG. 18 are the same as those of FIG. 16 except that the operations of step 0051 and step 0052 are performed in place of the operations of step 0041, step 0042, and step 0043.

At step 0051, the processor 41 determines the area radius n based on the speed of travel (speed v) and the correspondence table of FIG. 14. At step 0052, the processor 41 determines a circle that is centered around the current location of the mobile terminal 15 and has the radius n determined at step 0051, as an evaluation area. Thereafter, the processor 41 acquires the data on radio quality of the evaluation area (0022).

According to the fourth embodiment, as is the case in the third embodiment, the determination as to communication assignment may be made with the evaluation area having a size in accordance with the speed of travel v of the mobile terminal 15. Also, the communication assignment determination process is performed at intervals in accordance with the speed of travel v.

Fifth Embodiment

A fifth embodiment will be described next. The fifth embodiment has features in common with the third embodiment, and therefore differences from the third embodiment are mainly described and description of the common features is omitted. If, in the third embodiment, it is possible to further detect the direction of travel of the mobile terminal 15, the area (evaluation area) for which the probability density distribution is created may be defined more strictly.

Figure 19:
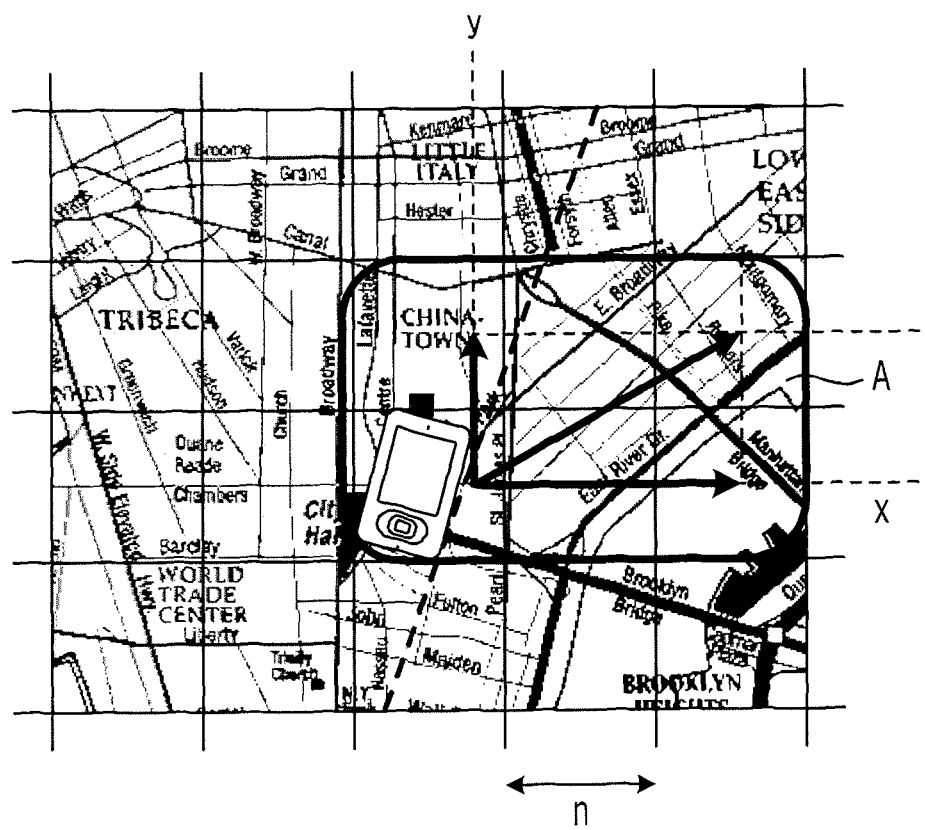
FIG. 19 illustrates a fifth embodiment.

For example, as illustrated in FIG. 19, it is assumed that the mobile terminal 15 is moving toward east-northeast in the communication area. In this case, one or more unit areas (see a region A indicated in gray in FIG. 19) located in the direction in which the mobile terminal 15 is predicted to move in a unit time are selected as an evaluation area. The direction is predicted from the rate vector of the mobile terminal 15. Subsequently, the probability density distribution of the selected evaluation area is created. An evaluation area is determined based on the x-axial component (vcos θ) and the y-axial component (vsin θ) of the rate vector of the mobile terminal 15, and the correspondence table of FIG. 14, for example.

Figure 20:
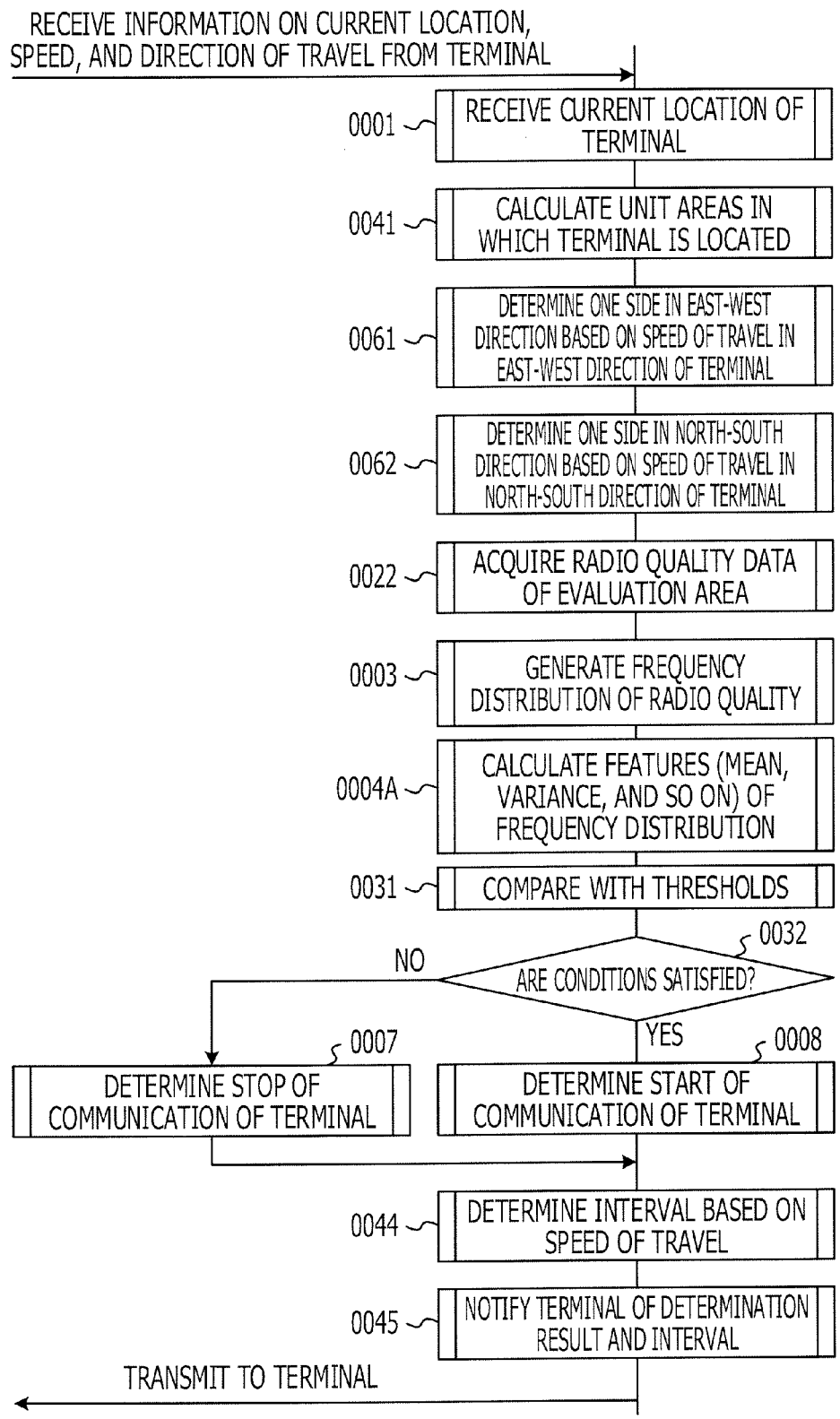
FIG. 20 is a flowchart illustrating an example of the communication assignment determination process in the fifth embodiment.

FIG. 20 is a flowchart illustrating an example of the communication assignment determination process in the fifth embodiment. In the determination process illustrated in FIG. 20, the server 13 receives information on the current location, the speed of travel v, and additionally the direction of travel, from the mobile terminal 15. The direction of travel may be determined from the current location and the previously current location. The configuration in which the direction of travel is calculated in the server 13 (the server 13 maintains information on the current location and calculates the direction of travel from the current location and the previously current location) may be adopted instead of the configuration in which the direction of travel is received from the mobile terminal 15.

In the process of FIG. 20, the operations at step 0061 and step 0062 are performed in place of the operations at step 0041, step 0042, and step 0043 in the third embodiment (FIG. 16). At step 0061, the processor 41 determines the length of one side in the east-west direction of an evaluation area based on the speed of travel (vcos θ) of the east-west direction (x direction) of the mobile terminal 15 and the correspondence table of FIG. 14.

At step 0062, the processor 41 determines the length of one side in the north-south direction of the evaluation area based on the speed of travel (vsin θ) of the north-south direction of the mobile terminal 15 (y direction) and the correspondence table of FIG. 14. Thus, the processor 41 creates a rectangular evaluation area having the above lengths in the xy directions and contains, as one of the corners, a unit area to which the current location of the mobile terminal 15 belongs (refer to A of FIG. 19). The subsequent operations are the same as illustrated in FIG. 16, and description of these operations is omitted.

In the fifth embodiment, the size and the direction of an evaluation area may be determined based on the speed of travel v and the direction of travel. Note that, in the fourth embodiment, a circular evaluation area is created, and the radius n of an evaluation area is determined in consideration of the speed of travel v. Therefore, an evaluation area that handles all the directions of travel of the mobile terminal 15 is generated (refer to FIG. 18). For this reason, the fifth embodiment is applied only in the case where the unit area is defined in advance.

Sixth Embodiment

A sixth embodiment will be described next. The sixth embodiment has a configuration that is applicable to the first to fifth embodiments, and therefore differences from these embodiments are mainly described and description of points in common with the embodiments is omitted. In the sixth embodiment, communication assignment is determined based on the size of an electronic file (file size) to be downloaded.

In particular, the server 13 changes the mean threshold and the variance threshold in accordance with the file size notified from the mobile terminal 15. If the file size is large, the mean threshold is made lower than the usual mean threshold (for example, the initialized value of the mean threshold) and the variance threshold is made higher than the usual variance threshold (for example, the initialized value of the variance threshold), so that the total downloading period of time is shortened. This enables delays to be reduced as much as possible, thereby enabling the downloading efficiency to be improved as compared with usual downloading.

In the sixth embodiment, the mean thresholds and the variance thresholds corresponding to a plurality of levels in accordance with file sizes are determined in advance. FIG. 21 illustrates an example of a correspondence table between the file size, and the mean and variance thresholds. The correspondence table illustrated in FIG. 21 is stored in advance in the hard disk 43 or the radio quality DB 43A.

In FIG. 21, file sizes f are $f_5 > f_4 > f_3 > f_2 > f_1 > 0$. Also, the mean thresholds μ are $\mu_1 \geq \mu_2 \geq \mu_3 \geq \mu_4 \geq \mu_5 > 0$, and the variance thresholds σ are $\sigma_5 \geq \sigma_4 \geq \sigma_3 \geq \sigma_2 \geq \sigma_1 > 0$. The combination of the mean threshold μ and the variance threshold σ with respect to the file size f may be obtained in advance using a computer simulation or an experiment.

Figure 22:
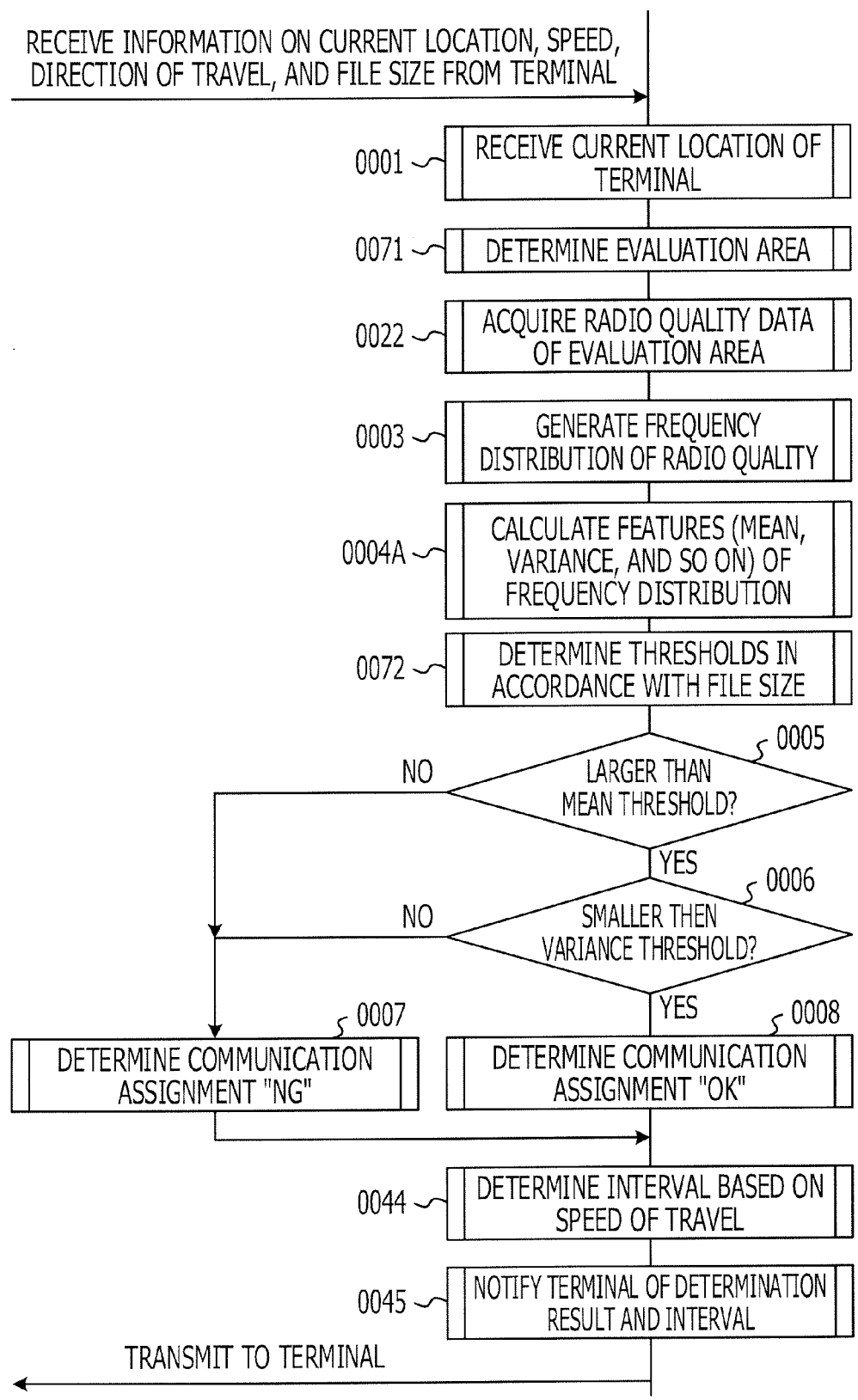
FIG. 22 is a flowchart illustrating an example of the communication assignment determination process in the sixth embodiment.

FIG. 22 is a flowchart illustrating an example of a communication assignment determination process in the sixth embodiment. FIG. 22 illustrates a process in which the operation of step 0072 is added to the communication assignment determination process of the fifth embodiment described above.

In the process of FIG. 22, the server 13 receives the current location, the speed of travel v, the direction of travel, and a file size from the mobile terminal 15. However, the configuration concerning the threshold determination of the sixth embodiment is applicable to any of the first to fourth embodiments.

At step 0071 of FIG. 22, the processor 41 of the server 13 performs an operation of determining an evaluation area. For example, the operations at step 0061 and step 0062 illustrated in FIG. 20 are performed as the operation at step 0071. However, the content of the operation at step 0071 is changed to be suitable for the embodiments (the first to fourth embodiments) to which the configuration of determining thresholds in accordance with the file size of the sixth embodiment is applied.

At step 0072, the processor 41 determines the thresholds used for threshold determination (0005 and 0006) by reading the mean threshold μ and the variance threshold σ in accordance with the file size f from the correspondence table (FIG. 21).

Except for the above operations, the process illustrated in FIG. 22 is the same as the process (FIG. 20) illustrated in the fifth embodiment, and therefore description of the process is omitted. Note that creation of the value of n % of CDF (mean correction value) and application of the mean correction value to the determination of thresholds (0005), which are performed at step 0004A of FIG. 22, are not indispensable requirements.

Seventh Embodiment

A seventh embodiment will be described next. The seventh embodiment has a configuration that is applicable to the first to fifth embodiments, and therefore differences from these embodiments are mainly described and description of points in common with the embodiments is omitted. In the seventh embodiment, the server 13 determines (changes) the mean threshold and the variance threshold depending on the number of connected users.

As the number of connected users (the number of users of the communication service) in an evaluation area increases, radio resources capable of being assigned for the evaluation area concerned are reduced. For this reason, if radio resources are assigned to non-real-time communication of a large number of users in the evaluation area concerned, there is a possibility that real-time communication performed in the evaluation area concerned is adversely influenced.

To address this, in the seventh embodiment, mean thresholds and variance thresholds corresponding to a plurality of levels of the number of connected users in an evaluation area are prepared so as to cause the assignment of radio resources to non-real-time communication to be less likely to occur in an evaluation area where the number of connected users is large. In contrast with this, in an evaluation area where the number of connected users is small, the radio resources are sufficiently available and therefore the thresholds are set to be low, so that radio resources are assigned as much as possible to non-real-time communication. This enables the frequency utilization efficiency to be improved.

FIG. 23 illustrates an example of a correspondence table between the number of connected users, and the mean threshold $\mu$ and the variance threshold $\sigma$. Here, $UE_5 > UE_4 > UE_3 > UE_2 > UE_1 > 0$. The mean thresholds $\mu$ is $\mu_5 \geq \mu_4 \geq \mu_3 \geq \mu_2 \geq \mu_1 > 0$, and variance thresholds $\sigma$ are $\sigma_1 \geq \sigma_2 \geq \sigma_3 \geq \sigma_4 \geq \sigma_5 > 0$. The combination of the number of connected users and the thresholds $\mu$ and $\sigma$ may be determined in advance using a computer simulation, an experiment, or the like. The correspondence table is stored in advance in the hard disk 43 or the radio quality DB 43A.

The flowchart of a communication assignment determination process in the seventh embodiment is substantially the same as the process illustrated in FIG. 22, and therefore is not illustrated in the drawing. In the seventh embodiment, when determining an evaluation area using any of schemes described in the first to fifth embodiments at step 0071, the processor 41 of the server 13 inquires of all the base stations belonging in the evaluation area the number of mobile terminals under the base stations, that is, the number of connected users. This enables the server 13 to obtain the number of connected users UE in the evaluation area.

Then, at step 0072, using the number of connected users, and the correspondence table of FIG. 23, the processor 41 reads the mean threshold $\mu$ and the variance threshold $\sigma$ corresponding to the number of connected users, and uses them for determining processing at step 0005 and step 0006. Except for the above, the seventh embodiment is the same as the sixth embodiment, and therefore description of the same operations is omitted.

Eighth Embodiment

The base station 12 includes the configuration of the server 13 illustrated in FIG. 5, and is capable of performing the configuration described in the first to seventh embodiment (communication assignment determination process) instead of the server 13. That is, the base station 12 may function as the server 13.

According to the present disclosure, the location where communication of a mobile terminal starts may be properly controlled.

In various aspects, the systems, apparatuses and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device, comprising:
a memory configured to store data of one or more indices of radio quality at a plurality of location points; and
a processor coupled to the memory and configured to:
identify one or more location points among the plurality of location points other than a current location point of a mobile terminal that requests communication, and
determine whether to permit the communication of the mobile terminal based on statistical information obtained from the one or more indices of the radio quality at the one or more location points;
wherein the processor is further configured to identify an evaluation area to which the current location point of the mobile terminal belongs,
wherein the processor identifies the one or more location points belonging to the evaluation area of the mobile terminal,
wherein the processor is further configured to obtain the statistical information including at least two feature values by calculating probability density function with respect to the one or more indices of the radio quality at the one or more location points,
wherein the at least two feature values include a mean and a variance of the one or more indices of the radio quality at the one or more location points, and
wherein the processor is further configured to permit the communication when the mean is larger than a first threshold and the variance is smaller than a second threshold.

2. The information processing device according to claim 1,
wherein the processor is further configured to select the first threshold and the second threshold in accordance with a size of a file to be downloaded by the communication.

3. The information processing device according to claim 1,
wherein the processor is further configured to select the first threshold and the second threshold in accordance with the number of users in the evaluation area.

4. An information processing device, comprising:
a memory configured to store data of one or more indices of radio quality at a plurality of location points; and
a processor coupled to the memory and configured to:
identify one or more location points among the plurality of location points other than a current location point of a mobile terminal that requests communication, and determine whether to permit the communication of the mobile terminal based on statistical information obtained from the one or more indices of the radio quality at the one or more location points;

wherein the processor is further configured to identify an evaluation area to which the current location point of the mobile terminal belongs, wherein the processor identifies the one or more location points belonging to the evaluation area of the mobile terminal, wherein the statistical information includes a cumulative frequency of a given proportion in a mean of the one or more indices of the radio quality at the one or more location points, and a variance of the one or more indices of the radio quality at the one or more location points, and wherein the processor is further configured to permit the communication when the cumulative frequency is larger than a first threshold and the variance is smaller than a second threshold.

5. A communication control method, comprising:

identifying one or more location points among the plurality of location points other than a current location point of a mobile terminal that requests communication;

determining, by a processor, whether to permit the communication of the mobile terminal based on statistical information obtained from the one or more indices of the radio quality at the one or more location points;

further comprising identifying an evaluation area to which the current location point of the mobile terminal belongs, wherein the identifying the one or more location points includes identifying the one or more points belonging to the evaluation area of the mobile terminal, further comprising obtaining the statistical information including at least two feature values by calculating probability density function with respect to the one or more indices of the radio quality at the one or more location points, wherein the at least two feature values include a mean and a variance of the one or more indices of the radio quality at the one or more location points, and further comprising permitting the communication when the mean is larger than a first threshold and the variance is smaller than a second threshold.

6. A mobile communication system, comprising:

a mobile terminal configured to request communication; and an information processing device configured to:

identify an evaluation area to which a current location of the mobile terminal belongs; and determine whether to permit the communication based on statistical information obtained from one or more indices of radio quality at a plurality of location points belonging to the evaluation area;

wherein the information processing device is further configured to identify an evaluation area to which the current location point of the mobile terminal belongs, and wherein the information processing device identifies the one or more location points belonging to the evaluation area of the mobile terminal, wherein the information processing device is further configured to obtain the statistical information including at least two feature values by calculating probability density function with respect to the one or more indices of the radio quality at the one or more location points, wherein the at least two feature values include a mean and a variance of the one or more indices of the radio quality at the one or more location points, and wherein the information processing device is further configured to permit the communication when the mean is larger than a first threshold and the variance is smaller than a second threshold.

* * * * *